United States Patent
Isaac

(10) Patent No.: US 8,638,931 B2
(45) Date of Patent: Jan. 28, 2014

(54) SIGNAL DESCRAMBLING DETECTOR

(75) Inventor: Roger Dwain Isaac, Campbell, CA (US)

(73) Assignee: Spansion LLC, Sunnyvale, CA (US)

( * ) Notice: Subject to any disclaimer, the term of this patent is extended or adjusted under 35 U.S.C. 154(b) by 1480 days.

(21) Appl. No.: 11/928,372

(22) Filed: Oct. 30, 2007

(65) Prior Publication Data

US 2009/0109769 A1    Apr. 30, 2009

(51) Int. Cl.
*H04L 12/66*  (2006.01)
*H04J 3/00*   (2006.01)
*H04N 7/167*  (2011.01)

(52) U.S. Cl.
USPC ............ 380/210; 380/211; 370/463; 370/498

(58) Field of Classification Search
USPC ............................ 370/463, 498; 380/210, 211
See application file for complete search history.

(56) References Cited

U.S. PATENT DOCUMENTS

| | | | | |
|---|---|---|---|---|
| 4,922,537 A | * | 5/1990 | Frederiksen | 704/212 |
| 4,991,169 A | * | 2/1991 | Davis et al. | 370/463 |
| 5,930,231 A | * | 7/1999 | Miller et al. | 370/210 |
| 6,078,937 A | * | 6/2000 | Vatinel | 708/209 |
| 7,860,249 B1 | * | 12/2010 | Harvey et al. | 380/211 |
| 2003/0196132 A1 | * | 10/2003 | Chiang | 713/503 |
| 2007/0083491 A1 | * | 4/2007 | Walmsley et al. | 707/3 |

OTHER PUBLICATIONS

Controlling the Real World With Computers http://www.learn-c.com/data_lines.htm Copyright © 2000, Joe D. Reeder.*
Understanding Big and Little Endian Byte Order http://betterexplained.com/articles/understanding-big-and-little-endian-byte-order/print/ Posted by kalid on Sep. 19, 2006.*

* cited by examiner

*Primary Examiner* — Kambiz Zand
*Assistant Examiner* — Benjamin Kaplan
(74) *Attorney, Agent, or Firm* — Turocy & Watson, LLP

(57) ABSTRACT

Systems and/or methods that facilitate descrambling of data communicated between a memory and a host processor are presented. A descrambler component determines the bit order of data signals from a memory device based on pattern information provided to the descrambler component by the memory device during initialization. The descrambler component can receive one or more distinct patterns and can evaluate the data values associated with such patterns for each data line of the memory. The descrambler component can determine the bit order of the data signals based on such patterns and can generate a transformation function that can facilitate rearranging data, which can be received from or sent to the memory device, into a predetermined bit order.

20 Claims, 13 Drawing Sheets

SIGNAL DESCRAMBLING DETECTOR

TECHNICAL FIELD

The present invention relates generally to memory systems and in particular to systems and methods for descrambling signals associated with a memory device.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of electrically programmable ROM (EPROM) with the electrical erasability of EEPROM. Flash memory is nonvolatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

Typically, a memory device can include data lines (e.g., Dq(0) through Dq(n−1) for an n-bit bus) that can be connected to a system bus associated with a host processor. Typically, when the memory device is first connected with a host processor, the host processor does not know the order of the data lines from the memory device, and thus does not know the bit order of the data signals being received from the memory device. As a result, if the host processor reads data from the memory device, the data can be presented by the memory device to the host processor in a scrambled order, as the host processor cannot determine which data signal is the least significant bit, which data is the most significant bit, etc.

Conventionally, in order to have the bit order of the data signals of a memory device known to other components (e.g., host processor), memory devices have been designed so that the routing of the data lines (e.g., bit lines) associated with and/or connected to the multi-bit bus are fixed. However, fixing the routing of the data lines in the memory device can result in certain constraints on the circuit layout of the memory device, which can impact the layout of other components and result in a less desirable memory device layout and/or result in a memory device that will have less density than it could otherwise have without the routing constraints.

Another conventional implementation relates to certain memory packages, such as certain dynamic random access memory (DRAM) packages. Certain DRAM packages have been designed so that the bit order of the memory device is unknown, but the data is written to or read from the memory in the same order so, since the data was written and stored in such memory device in an unknown order, the data can be read back from the memory in the same order it was written to such memory device, and as a result, other components (e.g., a host processor) can understand the data being read from such memory device.

However, certain types of memory devices, such as flash memory devices, cannot employ such a data constraint to facilitate communication of data between components. Typically, flash memory devices are structured such that the bit order of the data lines of the memory device is fixed. That is, for example, the data line for the least significant bit, Dq(0), is programmed to be Dq(0) and the data line for the most significant bit, Dq(n−1), is programmed to be Dq(n−1) during manufacturing. Further, when other components are connected to the memory device, the other components do not know which data line is associated with Dq(0), and which data line is associated with Dq(n−1) in the memory device, for instance.

It is desirable to descramble and determine the bit order of data signals and associated data lines of a memory device, so that accurate communication of data signals can be achieved between the host processor and memory device(s) as well as other components. It is further desirable to achieve descrambling of the signals in an efficient manner so as to have minimal impact on the component layout in the chip package.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate descrambling of signals associated with one or more memory devices (e.g. flash memory devices). In accordance with one aspect of the disclosed subject matter, a descrambler component can be employed to facilitate determining the bit order(s) of data lines, and thus data signals, associated with a memory device(s) so that the data signals to/from the memory device(s) can be arranged in a desired predetermined bit order (e.g., arranged from the most significant bit (MSB) to the least significant bit (LSB)) so that the data can be accurately recognized by other components, such as the host processor and/or cryptographic component, for example. The descrambler component can be included in and/or associated with a controller component that can facilitate control of communications between the host processor and the memory device(s).

A memory device can be connected to a host processor or other component associated therewith such that the memory device can send and/or receive data signals from the host processor. Upon powering up of the components, the memory device can be initialized, where the descrambler component can descramble the data signals between the memory device and the host processor. In one embodiment, the descrambling of the data lines can be performed each time the components are powered up. In accordance with another embodiment, the descrambling of the data signals/data lines can be performed the first time the components are connected and powered up, and the descrambling information (e.g. transformation information) can be stored in the controller component to facilitate transforming incoming and outgoing data signals so that such data signals are received or transmitted via bus lines in a desired predetermined bit order.

In accordance with another aspect of the disclosed subject matter, to facilitate descrambling of the data signals, the memory device can contain one or more predetermined patterns, which can be known by the descrambler component. The memory device can provide pattern information (e.g., the patterns) to the descrambler component and the descrambler component can compare the bit order of the received pattern information to the expected bit order of the pattern information and can evaluate such information to determine the desired bit order (e.g., arranged from the MSB to the LSB) of the data signals associated with the memory device. In accordance with various other aspect of the disclosed subject matter, the memory device can employ a register (e.g., shift register, rotate register) that can either shift or rotate a pattern to generate a different pattern that can be provided to the descrambler component to facilitate descrambling of data signals; and/or data masking can be employed, where a predetermined number of distinct patterns can be provided by the memory to the descrambler component and such distinct patterns can be structured so that the descrambler component can determine the bit order of the data signals/data lines of the memory device based on the distinct patterns.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
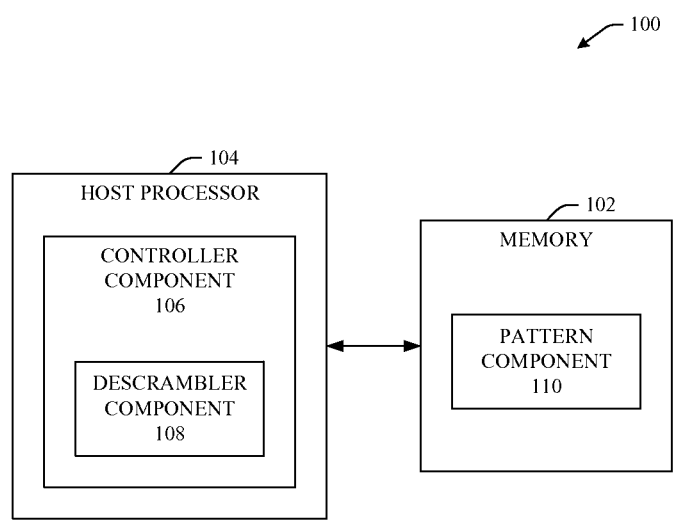
FIG. 1 illustrates a block diagram of a system that can descramble data signals in a memory device in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Memory devices can be used to maintain and store data and instructions for various computers and similar systems. In particular, flash memory devices have become a popular type of memory because it can be rewritten and can retain content without consumption of power. Typically, the bit order of the data lines of a memory device is not known by other system component, for instance, a host processor, when the memory device is initially connected to the host processor. Conventionally, path constraints have been employed to fix the data lines so that the bit order of the data lines and thus the data signals can be known. However, such path constraints can result in a suboptimal circuit layout in the memory device. It is desirable to descramble and determine the bit order of data signals and associated data lines of a memory device to facilitate communication of data between the host processor and the memory device as well as other components. It is further desirable to achieve descrambling of the signals in an efficient manner so as to have minimal impact on the component layout in the chip package.

Systems and/or methods are presented that facilitate determining a bit order of data lines of a memory device to facilitate communication of data between the memory device and other components (e.g., host processor). A controller component, which can be associated with a host processor, can include a descrambler component that can receive predefined pattern information from the memory device and can descramble or determine the bit order of data lines of the memory device that are associated with the multi-bit bus and can rearrange the bit order of data to correspond to a desired predetermined bit order (e.g., arranged from most significant bit (MSB) to least significant bit (LSB)) to facilitate communication of data between the memory device and the host processor as well as other components. The subject innovation can enable determination of the bit order of the data lines to facilitate communication with the memory device without undue or undesirable data constraints or path constraints (e.g., line routing restrictions) being placed on the structure of the memory device.

Turning to the figures, FIG. 1 illustrates a system 100 that can facilitate determining the bit order of data signals and data lines associated with a memory in accordance with the disclosed subject matter. System 100 can include a memory 102 that can be a non-volatile memory (e.g., flash memory device) or a volatile memory (e.g., dynamic random access memory (DRAM)). The memory 102 can include a plurality of memory locations (not shown) (e.g., memory cells in a flash memory device) wherein each memory location can store one or more bits of data. Data can be written to a memory location(s) in the memory 102 and stored therein, and data can also be read from the memory location(s) and provided as an output from the memory 102 via data lines (e.g., memory bus) (not shown) in the memory 102 and provided to a system bus, which can be a multi-bit bus.

The memory 102 can be associated with a host processor 104 that can be can be an applications processor that can manage communications and run applications. For example, the host processor 104 can be a processor that can be utilized by a computer, a mobile handset, personal digital assistant (PDA), or other electronic device. The host processor 104 can generate commands, such as read commands, write commands, and/or erase commands that can be executed respectively to read data from, write data to, and/or erase data from the memory 102. Data being written to or read from memory 102 can be communicated or transmitted between the memory 102 and the host processor 104 and/or other components (not shown) via a bus (e.g., system bus), which can be a multi-bit bus comprised of n bit lines. For example, the bus can be comprised of n lines, where n can be equal to 2, 4, 8, 16, 32, 64, or more data lines. The bus can further include control lines that can facilitate communicating control information, memory address information, and/or other information to facilitate executing operations (e.g., read, write, erase) on the memory 102 to facilitate communication of data between the memory 102 and the host processor 104 and/or other components.

The host processor 104 can include a controller component 106 that can facilitate controlling accessing data to/from the memory 102. The controller component 1106 can facilitate coordinating the data sent to or received from the memory 102 so that the data is presented in a form (e.g., bit order) such that the data can be understood and utilized by the components (e.g., memory 102, host processor 104, other components). Also, where there are multiple memory devices 102 associated with the host processor 104, the controller component 106 can control the access of each memory device 102, including managing the access of each memory device 102 during the initialization of such memory devices 102 to descramble the data signals/data lines associated with each respective memory device 102.

Typically, a memory device can be designed to communicate data across a multi-bit bus that can be connected to the memory device. Since multi-bit pieces of data can be transmitted through each line of the bus in parallel, it is paramount for other components, such as a host processor, to know the bit order of the data being transmitted from the memory device. Conventionally, memory devices have been designed so that the routing of the data lines (e.g., bit lines) associated with and/or connect to the multi-bit bus are fixed, so that the bit order can be known by other components. However, fixing the routing of the data lines can result in certain constraints on the circuit layout of the memory device, which can impact the layout of other components and result in a less desirable memory device layout and/or result in a memory device that will have less density than it could otherwise have without the routing constraints.

Also, conventionally, certain memory packages (e.g., certain DRAM packages) have been designed so that the bit order of the memory device is unknown, but the data is written to or read from the memory in the same order so, since the data was written and stored in such memory device in an unknown order, the data can be read back from the memory in the same order it was written to such memory device, and as a result, other components (e.g., a host processor) can understand the data being read from such memory device. However, certain types of memory devices, such as flash memory devices, cannot employ such a data constraint to facilitate communication of data between components. Typically, flash memory devices are structured such that the bit order of the data lines of the memory device is fixed. That is, for example, the data line for the least significant bit, Dq(0), is programmed to be Dq(0) and the data line for the most significant bit, Dq(n−1), is programmed to be Dq(n−1) during manufacturing. Further, when other components are connected to the memory device, the other components do not know which data line is associated with Dq(0), and which data line is associated with Dq(n−1) in the memory device, for instance.

The subject innovation can facilitate determining the bit order of the data lines of a memory device(s) and thus the respective data signals associated therewith, while not placing undue constraints on the layout of the data lines of the memory device(s) or on the communication of data.

The controller component 106 can include and/or can be associated with a descrambler component 108 that can facilitate descrambling or determining the bit order of the data lines of the memory 102 so that data communicated from the memory 102 across a multi-bit bus can be rearranged in a desired bit order (e.g., from MSB to LSB) when received by the host processor 104, and data communicated across the multi-bit bus to the memory 102 from the host processor 104 can be presented to the memory 102 in a proper or desired bit order.

To facilitate determining the bit order for the data lines (e.g., Dq(0) through Dq(n−1)) of the memory 102 connected to the multi-bit bus, and thereby the bit order of data communicated via such data lines, the memory 102 can include a pattern component 110 that can be comprised of more or more predetermined patterns that can be stored in the memory 102, and such patterns can be retrieved and provided to the descrambler component 108 to facilitate determining the bit order of the data lines. Each pattern can include a predetermined number of bits of data that can correspond to the number of data lines associated with the memory 102 and/or the number of data lines of the bus. In accordance with one aspect, each pattern can be comprised of n bits of data for a memory 102 that has n data lines connected to an n-bit bus. The descrambler component 108 can know the pattern information that is going to be provided by the memory 102, and with such knowledge, can compare the bit order of the provided pattern information with the expected bit order of the pattern information, as more fully described herein.

In accordance with one aspect of the disclosed subject matter, a series of shifts of bits in a predetermined data pattern can be employed to facilitate descrambling data signals from the memory 102. A predetermined n-bit pattern can be generated and stored as part of the pattern component 110 in the memory 102. The n-bit pattern can be provided to a register (not shown) in the memory 102, where the register can be a shift register, in accordance with an aspect of the disclosed subject matter. Each bit of the pattern, except for the LSB, can have a value of 1, and the LSB can have a value of 0. For example, given an 8-bit bus, the pattern can have 8 bits with the value 1111 1110. The register can provide this pattern to the descrambler component 108 via the bus, and the descrambler component 108 can receive this pattern and can detect which data line of the bus has the value of 0. The descrambler component 108 can analyze this information, and based on this information, the descrambler component 108 can determine that the data line of the bus that provided the output of 0 to the descrambler component 108 can be connected to data line, Dq(0), in the memory 102.

The register in the memory 102 can shift the n-bit pattern so that the 0 value can be shifted to the next bit in the pattern, that is, the bit immediately adjacent to the LSB. For example, given an 8-bit pattern, such pattern, as shifted, can now be 1111 1101. The memory 102 can transmit such pattern, as shifted, to the descrambler component 108, where the descrambler component 108 can detect which data line of the bus is communicating the value of 0, can analyze the detected information, and can determine that the data line communicating the 0 value corresponds with and/or is connected to the data line, Dq(1), in the memory 102.

The register can again shift the pattern by one bit, so that the 0 value can be moved to the next significant bit in the pattern (e.g., 1111 1011 for 8-bit pattern) and can provide this pattern, as shifted, to the descrambler component 108, which can detect the 0 value and determine data line Dq(2) from such pattern information. Such shifting of the pattern bits and communication of such pattern information to the descrambler component 108 can continue until the bit order for all data lines of the memory 102 have been determined by the descrambler component 108, except for the data line, Dq(n−1), corresponding to the MSB of the bit order associated with the data lines of the memory 102. Once the bit order of data lines Dq(0) through Dq(n−2) have been determined, the descrambler component 108 can determine that the data line, Dq(n−1), which can correspond to the MSB of the data lines of the memory 102, can be the remaining data line of the memory 102 that has yet to be assigned a place in the bit order. The descrambler component 108 can utilize the bit order information associated with the data lines of the memory 102 to descramble the data signals output from the memory 102 as well as rearrange data being written to memory so that the data can be in a bit order that corresponds with the bit order associated with the data lines of the memory 102. For example, the bit order of the data can be rearranged in order from the MSB to the LSB.

For example, given data lines 0 through 7 for an 8-bit bus, if it determined that data line 3 of the bus has not provided a 0 value to the descrambler component 108 with regard to the pattern information presented, but data lines 0 through 2 and 4 through 7 have provided a 0 value to the descrambler component 108 based on presented pattern information, the descrambler component 108 can determine that the data line in the memory 102 that is connected and/or associated with data line 3 of the bus can be data line, Dq(n−1), which can be associated with the MSB in the bit order of the data lines of the memory 102. Thus, for n-bit data lines connected to an n-bit bus, the bit order of the data lines of the memory 102 can be determined utilizing n−1 patterns based on a retrieved pattern and n−2 bit shifts of the retrieved pattern, where such patterns can be based on a single n-bit pattern that can be shifted as desired to yield the n−1 patterns.

Alternatively, in accordance with another aspect, to facilitate determining Dq(n−1), the register can shift the pattern one bit from its previous position (e.g., 1011 1111 for an 8-bit pattern) so that the pattern can have a 0 value for the MSB (e.g., 0111 1111 for an 8-bit pattern), and such pattern can be communicated to the descrambler component 108 via the bus, where the descrambler can detect and analyze such pattern information, and can determine that Dq(n−1) is the data line in the memory 102 that corresponds with the data line of the bus that provided the 0 value to the descrambler component 108. Thus, in accordance with this aspect, for n-bit data lines connected to an n-bit bus, the bit order of the data lines of the memory 102, and thus the bit order of the data communicated via such data lines, can be determined utilizing n patterns, where such patterns can be based on a single n-bit pattern that can be shifted as desired to yield the n patterns.

In accordance with another aspect of the disclosed subject matter, a series of bit rotations with regard to bits of a pattern associated with the pattern component 110 can be performed by a register in the memory 102 to facilitate descrambling data signals output from the memory 102. A predetermined pattern can be generated and stored in the memory 102. The pattern component 110 can provide the pattern, where, given a memory 102 having n data lines, the pattern can be an n-bit pattern. Similar to the pattern employed for the bit shifting of data bits, the pattern employed with the series of rotations can have the value of all bits but one bit set to a value of 1, and the remaining bit, which can be the LSB, can have a value of 0. The memory 102 can provide the pattern to the descrambler component 108, and, similar to the bit shifting pattern technique, the descrambler component 108 can determine that data line, Dq(0), is the data line that provided a 0 value to the descrambler component 108. The register can then rotate the pattern one bit in either direction such that the 0 value can be either in the next significant bit or can be wrapped around so that the 0 value can be in the MSB position. The descrambler component 108 can have prior knowledge as to which direction the bits are being rotated, so the descrambler component 108 can next determine that either the data line that provides a 0 value is Dq(1) if the pattern is rotated so the 0 moves to the next significant bit adjacent to the LSB or Dq(n−1) if the pattern is rotated so the 0 wraps around and moves to the MSB position. The series of bit rotations can continue until all but one bit position has been determined, at which point, the descrambler component 108 can determine that the remaining data line is associated with the only bit position that has not been determined yet. Thus, there can be n−2 bit rotations for the bits of the presented pattern, thereby resulting in n−1 patterns that can be presented to the descrambler component 108 to facilitate descrambling the data signals from the memory 102.

Alternatively, in accordance with another aspect, the there can be n−1 bit rotations for the bits of the presented pattern thereby resulting in n patterns that can be presented to the descrambler component 108, where the descrambler component 108 can determine the last position of the bit order based on the $n^{th}$ pattern presented, instead of determining the last position based on the data line that remained undetermined after the $(n-1)^{th}$ pattern was presented.

In accordance with still another aspect of the disclosed subject matter, data masking can be employed to facilitate determining the bit order of the data lines of the memory 102 to descramble the data signals received from the memory 102. With data masking, the pattern component 110 can be comprised of m predetermined patterns that can be provided to the descrambler component 108 to facilitate determining the bit order of data signals and data lines associated with the memory 102. The number of patterns m that are generated by the pattern component 110 can be determined as $n=2^m$, where n can be the number of data lines (e.g., bit lines) associated with the memory 102. For example, given an 8-bit bus associated with 8 data lines in memory 102, m can equal 3, since $n=8=2^3$, and thus, 3 patterns can be generated to facilitate descrambling the data signals from the memory 102. As another example, given 16 data lines in the memory 102, m can equal 4, and 4 patterns can be generated to facilitate descrambling the data signals from the memory 102.

The predetermined patterns can be structured so that the descrambler component 108 can receive the pattern information associated with each pattern, and based on the received pattern information, the descrambler component 108 can determine the bit order of the data lines in the memory 102 and thus the bit order of the data signals communicated to/from the memory 102. In one aspect, the patterns can be structured so that each pattern is distinct and each data line in the memory 102 can transmit a respective subset of data that can be distinct to facilitate identifying each of the data lines. That is, given pattern information comprised of m n-bit patterns, each of the m patterns can have a distinct binary value such that the m patterns can result in n distinct significant bit combinations that each have a distinct value when the corresponding significant bits of each pattern are combined or grouped together.

In accordance with an aspect, the patterns can have respective bit values such that a first pattern can have one-half of its bits on the MSB-side of the pattern set to a value of 1 and the other half of the bits on the LSB-side of the pattern set to a value of 0 (e.g., 1111 0000 for 8-bit pattern); a next pattern can be structured such that half of the bits associated with the MSB, which have a value 1 in the first pattern, and which are least significant bits of that subset of MSBs, can be set to a value of 0 with the other half of the bits associated with the MSB set to a value of 1, and half of the bits associated with the LSB, which have a value of 0 in the first pattern, and which are the most significant bits of that subset of LSBs, can be set to a value of 1 and the other half of the bits which can be the least significant bits of the subset of LSBs can be set to a value of 0 (e.g., 1100 1100 for 8-bit pattern); and this pattern structuring can continue until a last pattern can be generated where the pattern can have values that alternate, where the LSB can have a value of 0, the next significant bit can have a value of 1, the following bit can have a value of 0, with the MSB having a value of 1 (given an even number of bits) (e.g., 1010 1010 for 8-bit pattern).

When the memory device 102 is connected (directly or indirectly) and/or associated to the host processor 104, and the memory 102, host processor 104, and/or other components are powered up, the data patterns associated with the pattern component 110 can be retrieved from storage in the memory 102 and can be communicated to the descrambler component 108. The memory 102 can communicate each pattern to the descrambler component 108 via the data bus. The descrambler component 108 can receive such pattern information, can detect the signal values of each bit of pattern information received, and can aggregate such pattern information such that the data from each pattern received via each respective data line of the bus can be grouped or associated together in the order received. The descrambler component 108 can analyze the pattern information, or a subset thereof, and can determine the bit order of the data lines of the memory 102 and associated bus data lines to facilitate descrambling the data signals sent from the memory 102

For example, given an 8-bit bus associated with a memory 102 having 8 data lines, Dq(0) through Dq(7), the desired number of patterns m to facilitate descrambling of the data signals can be 3 (e.g., n=8=2^3). A first pattern can be generated and can be structured as 1111 0000. A second pattern can be generated and structured as 1100 1100. A third pattern can also be generated and structured as 1010 1010. The three data patterns can be stored in the memory 102. When the memory device 102 is connected to the host processor 104, and these components are powered up, the three data patterns associated with the pattern component 110 can be retrieved from storage in the memory 102 and can be communicated to the descrambler component 108. The descrambler component 108 can receive such pattern information and can detect the signal values of each bit of pattern information received. The descrambler component can aggregate such pattern information such that the data from each pattern received via each respective data line of the bus can be grouped or associated together in the order received. The descrambler component 108 can analyze such pattern information, or a subset thereof, and can determine the bit order of the data lines of the memory 102 and associated bus data lines.

Given the three patterns of the example, the descrambler component 108 can determine data line, Dq(0), as the data line providing a value of 0 for all three patterns. Descrambler component 108 can determine data line, Dq(1), as the data line providing a value of 0 for the first pattern, a value of 0 for the second pattern, and a value of 1 for the third pattern. The descrambler component 108 can continue analyzing the respective data values received from each data line for each pattern to determine the bit order of the remaining data lines, where the descrambler component 108 can determine that the data line associated with the MSB provided a value of 1 for each of the three patterns. To further illustrate with Table 1 below:

TABLE 1

|  | Dq(7) | Dq(6) | Dq(5) | Dq(4) | Dq(3) | Dq(2) | Dq(1) | Dq(0) |
| --- | --- | --- | --- | --- | --- | --- | --- | --- |
| Pattern 1 | 1 | 1 | 1 | 1 | 0 | 0 | 0 | 0 |
| Pattern 2 | 1 | 1 | 0 | 0 | 1 | 1 | 0 | 0 |
| Pattern 3 | 1 | 0 | 1 | 0 | 1 | 0 | 1 | 0 |

Based on the received pattern information shown in Table 1, the descrambler component 108 can determine the bit order of the data lines associated with the memory 102 as follows: Dq(0)=000, Dq(1)=001, Dq(2)=010, Dq(3)=011, Dq(4)=100, Dq(5)=101, Dq(6)=110, and Dq(7)=111.

Upon determining the bit order of the data lines of the memory 102, the descrambler component 108 can store such information (e.g., descrambling information), and the descrambling information can be utilized by the descrambler component 108 to facilitate generating a transformation function that can be utilized by the host processor 104 and other components to facilitate transforming data received from the memory 102 into the proper bit order (e.g., determined bit order) and/or transforming data to the proper bit order before such data is written to a memory location(s) in the memory 102.

Referring back to the memory 102, the memory 102 can be comprised of nonvolatile memory such as read only memory (ROM), programmable ROM (PROM), electrically programmable ROM (EPROM), electrically erasable programmable ROM (EEPROM), or flash memory (e.g., single-bit flash memory, multi-bit flash memory), or volatile memory such as random access memory (RAM), static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), and the like. Further, the flash memory can be comprised of NOR flash memory and/or NAND flash memory.

Figure 2:
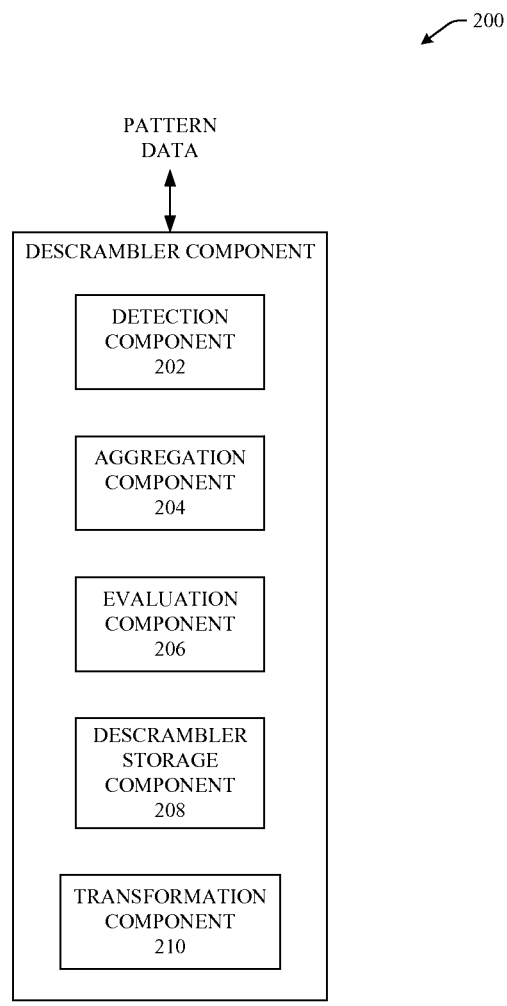
FIG. 2 depicts a block diagram of another system that descrambles data signals in a memory device in accordance with an aspect of the disclosed subject matter.

Turning to FIG. 2, depicted is a block diagram of a system 200 that can facilitate descrambling of the bit order of data associated with a memory in accordance with the disclosed subject matter. System 200 can include a descrambler component 108 that can facilitate determining or descrambling the bit order of data lines of a memory 102 (not shown) that can be connected to and/or associated with a multi-bit bus, which can be associated with a host processor 104 (not shown).

The descrambler component 108 can receive pattern information, for example, from a memory 102. The descrambler component 108 can determine the bit order of data lines of the memory 102 based on the pattern information. The descrambler component 108 can include a detection component 202 can facilitate detecting the respective data values of each bit of pattern information received. For example, if the detection component 202 receives a pattern 1111 1110, the detection component can determine that the LSB has a value of 0 and all the other bits have a value of 1.

The descrambler component 108 can also contain an aggregation component 204 that can aggregate and/or organize the data received by the descrambler component 108 in order to facilitate descrambling of data signals received from the memory 102. The aggregation component 204 can filter, select, and/or organize the data received by the descrambler component 108. For instance, the aggregation component 204 can identify portions of data that can be associated with pattern data received by the detection component 202. The aggregation component 204 can filter and/or organize such data so that each bit of such data can be associated with the respective data line of the bus that provided such bit of data and thus the corresponding data line of the memory 102 connected to such bus data line and/or can associate each bit of data with the pattern that provided each respective bit of data to facilitate analysis and evaluation of the data. It is to be appreciated that the aggregation component 204 can be incorporated into the descrambler component 108 (as depicted), or a stand-alone component, and/or most any suitable combination thereof.

Descrambler component 108 can further include an evaluation component 206 that can analyze and evaluate data (e.g., pattern data) received by the descrambler component 108, and can make determinations regarding the bit order of data lines associated with the memory 102. The evaluation component 206 can analyze and evaluate each bit of pattern data, or a portion thereof, where the each respective bit of pattern data can be associated with the data line of the bus (and thus the corresponding data line of the memory 102) that provided such bit of data and/or associated with a respective pattern from which such bit of data was provided.

When a series of bit shifts or bit rotations are employed, the evaluation component 206 can receive information as to which data line of the bus provided the particular data bit having a value of 0. Further, the evaluation component 206 can determine which position of the bit order is being determined based on whether the pattern information is being bit shifted or bit rotated and the bit positions, if any, that have previously been evaluated by the evaluation component 206. Based on the bit value information and previous bit position information, the evaluation component 206 can determine the bit position of the bus data line, and corresponding data line in the memory 102, that provided the 0 value and can determine the bit order of such data line associated with the memory 102.

When data masking is employed, the evaluation component 206 can receive the pattern information as organized such that each data bit can be organized based on the respective data line that provided each respective bit and the respective pattern that provided each respective bit. The evaluation component 206 can evaluate each subset of data respectively associated with each data line of the memory 102 and can determine each such data line based on the corresponding subset of data. The evaluation component 206 can know the pattern information that is going to be provided by the memory 102, and with such knowledge, can compare the bit order of the provided pattern information with the expected bit order of the pattern information to facilitate identifying and/or determining the bit order of the data lines of the memory (e.g., memory bus).

The descrambler component 108 can contain a descrambler storage component 208 that can facilitate storing information, such as pattern information, received by the descrambler component 108. Such information can be aggregated and grouped by the aggregation component 204 and can be stored in the descrambler storage component 208 as aggregated or grouped.

Descrambler component 108 can also include a transformation component 210 that can receive the descrambling information, such as the bit order of the data lines of the memory 102, and can facilitate generating a transformation function that can be utilized to transform data received from the memory 102 so that the data received from the memory 102 can be properly interpreted and understood by the host processor 104 (not shown) and other components (not shown).

Figure 3:
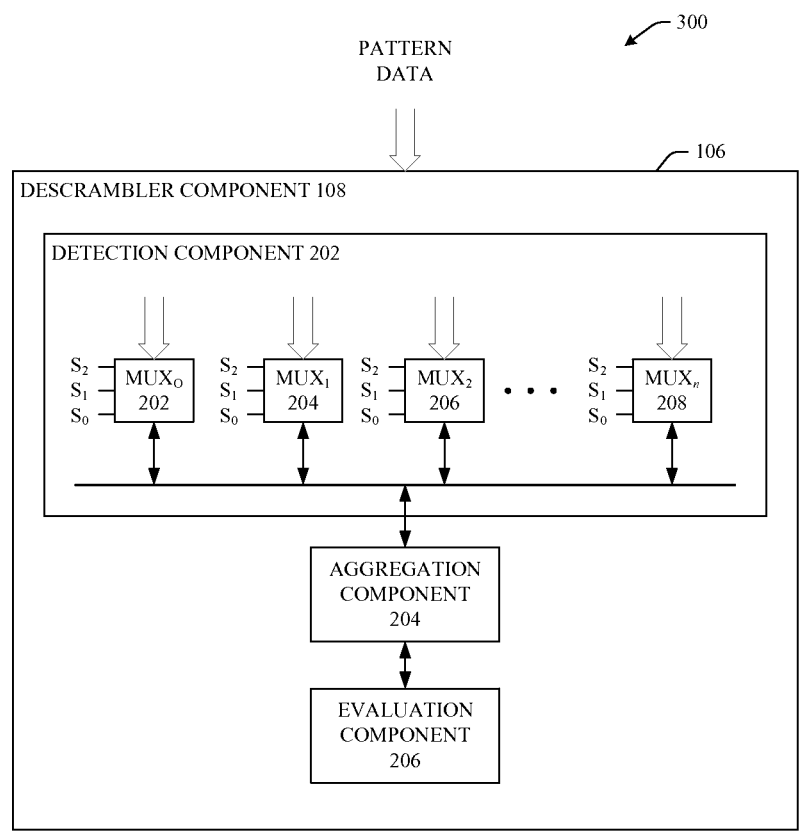
FIG. 3 illustrates a block diagram of a system that can descramble data signals in a memory device in accordance with an embodiment of the subject matter disclosed herein.

Referring to FIG. 3, depicted is a system 300 that can facilitate descrambling data signals associated with a memory in accordance with an embodiment of the disclosed subject matter. System 300 can include a descrambler component 108 that can facilitate descrambling received data signals output by a memory 102 (not shown). The descrambler component 108 can contain a detection component 202 that can receive data (e.g., pattern data) via a bus (e.g., n-bit bus) and can detect bit information based on the pattern information to facilitate determining the bit order of data lines associated with a memory 102 (not shown). The detection component 202 can be associated with an aggregation component 204 that can collect and organize data received by the descrambler component 108. Descrambler component 108 can further include an evaluation component 206 that can analyze and evaluate the data and can make determinations based on the data, such as, for example, determinations relating to the bit order of the data lines associated with the memory 102. The descrambler component 108, detection component 202, aggregation component 204, and evaluation component 206 can each include the same or similar respective functionality, as described herein, for example, with regard to system 100 and/or system 200.

In accordance with one aspect, the memory 102 can include n data lines that can be associated with an n-bit bus, and the n-bit bus can be associated with the descrambler component 108. Given n-bit data lines, the detection component 202 can be correspondingly comprised of n multiplexers (also referred to herein as "mux" in the singular and "muxes" in the plural), $mux_0$ 302, $mux_1$ 304, $mux_2$ 306, up to and including $mux_n$ 308, that each can receive the pattern data (e.g., n-bit patterns) from the memory 102.

Each mux 302, 304, 306, 308 can have a specified number of selector inputs that can receive and input respective binary data to each mux 302, 304, 306, 308 to facilitate providing a desired output for each mux 302, 304, 306, 308 such that, where the input data (e.g., pattern data) is comprised of all bits having a value of 1, except for one particular bit, which can have a value of 0, there can be one particular mux with a predetermined binary value as a selector input which can provide the data input value of 0 of the particular bit as a value of 0 as an output from such mux, while the other muxes can provide a value of 1 as an output. The number of selector inputs can be determined based on the number of data lines input into each of the respective muxes 302, 304, 306, 308, which can each receive the same set of data (e.g., pattern data) from the memory 102. For example, given an n-bit bus, where n=8, the number of selector inputs can be $\log_2(n)=\log_2(8)=3$, and as a result there can be 3 selector inputs associated with each of the muxes 302, 304, 306, 308. Each mux 302, 304, 306, 308 can have a different selector input value to facilitate generating a desired output from the muxes 302, 304, 306, 308.

Further, each mux 302, 304, 306, 308 can include a strobe input, Dq(s) (not shown), that can receive a strobe signal to facilitate determining whether the input data is valid or not. Also, each mux 302, 304, 306, 308 can contain a mask input, Dq(m) (not shown), that can facilitate data masking.

To illustrate with an example, given 8 data lines, Dq(0) through Dq(7), in the memory 102, there can be 3 selector inputs, S2, S1, and S0, associated with each of the muxes (e.g., 302, 304, 306, 308). As illustrated with the following tables, the data lines, Dq(0) through Dq(7), can be determined based on the pattern data input to the muxes. Initially, a predetermined pattern that can be known by the descrambler component 108 can be provided by the memory 102, where the pattern can be 1111 1110, for example. The input of 1111 1110 to the muxes can yield the following results:

TABLE 2

| S2 | S1 | S0 | PATTERN | MUX OUTPUT | DATA LINE |
| --- | --- | --- | --- | --- | --- |
| 0 | 0 | 0 | 1111 1110 | 0 | Dq(0) |
| 0 | 0 | 1 | 1111 1110 | 1 | Dq(1) |
| 0 | 1 | 0 | 1111 1110 | 1 | Dq(2) |
| 0 | 1 | 1 | 1111 1110 | 1 | Dq(3) |
| 1 | 0 | 0 | 1111 1110 | 1 | Dq(4) |
| 1 | 0 | 1 | 1111 1110 | 1 | Dq(5) |
| 1 | 1 | 0 | 1111 1110 | 1 | Dq(6) |
| 1 | 1 | 1 | 1111 1110 | 1 | Dq(7) |

As depicted in Table 2, given a pattern input of 1111 1110, only one mux provides an output of 0, which can correspond to data line, Dq(0). The evaluation component 206 can receive such information and can determine that the data line that provided the 0 value is Dq(0). If bit shifting of the pattern bits is employed, the pattern can be shifted from 1111 1110 to 1111 1101. The new pattern 1111 1101 can be provided by the memory 102 as input into the descrambler component 108 and the detection component 202 therein. Such input to the muxes (e.g., 302, 304, 306, 308) can yield results as shown in the following table:

TABLE 3

| S2 | S1 | S0 | PATTERN | MUX OUTPUT | DATA LINE |
| --- | --- | --- | --- | --- | --- |
| 0 | 0 | 0 | 1111 1101 | 1 | Dq(0) |
| 0 | 0 | 1 | 1111 1101 | 0 | Dq(1) |
| 0 | 1 | 0 | 1111 1101 | 1 | Dq(2) |
| 0 | 1 | 1 | 1111 1101 | 1 | Dq(3) |
| 1 | 0 | 0 | 1111 1101 | 1 | Dq(4) |
| 1 | 0 | 1 | 1111 1101 | 1 | Dq(5) |
| 1 | 1 | 0 | 1111 1101 | 1 | Dq(6) |
| 1 | 1 | 1 | 1111 1101 | 1 | Dq(7) |

As illustrated in Table 3, given a pattern input of 1111 1101, only one mux renders an output of value 0 and such mux can correspond to data line Dq(1). The evaluation component 206 can receive such information and can determine that the data line that provided the 0 value is Dq(1). Such serial bit shifting can be continued until the bit order of the data lines of the memory 102 are determined. For example, in accordance with an aspect, the serial bit shifting can continue until the pattern is 1011 1111, and the muxes (e.g., 302, 304, 306, 308) can yield the results as shown in the following table:

TABLE 4

| S2 | S1 | S0 | PATTERN | MUX OUTPUT | DATA LINE |
| --- | --- | --- | --- | --- | --- |
| 0 | 0 | 0 | 1011 1111 | 1 | Dq(0) |
| 0 | 0 | 1 | 1011 1111 | 1 | Dq(1) |
| 0 | 1 | 0 | 1011 1111 | 1 | Dq(2) |
| 0 | 1 | 1 | 1011 1111 | 1 | Dq(3) |
| 1 | 0 | 0 | 1011 1111 | 1 | Dq(4) |
| 1 | 0 | 1 | 1011 1111 | 1 | Dq(5) |
| 1 | 1 | 0 | 1011 1111 | 0 | Dq(6) |
| 1 | 1 | 1 | 1011 1111 | 1 | Dq(7) |

As illustrated in Table 4, given a pattern input of 1011 1111, only one mux provides an output of value 0 and that mux can correspond to data line Dq(6). The evaluation component 206 can determine that the mux that output the 0 value can correspond to Dq(6). As all the data lines have been determined, except for Dq(7), the evaluation component 206 can determine that the remaining data line from the memory 102 that has not been assigned a bit position, and the evaluation component 206 can determine that such data line can be Dq(7).

In accordance with another aspect, serial bit rotation of the pattern bits can be employed and can yield corresponding and/or similar results as that achieved with serial bit shifting of the pattern bits. The descrambler component 108 can have information or can access information so that the descrambler component 108 can know whether the pattern information is being bit shifted serially, bit rotated serially, and/or if multiple patterns are being provided, where the number of patterns provided can be based on the number of data lines in the bus, and no bit shifting or rotating is occurring. Further, the descrambler component 108 can know the pattern information that is going to be provided by the memory 102, and with such knowledge, can compare the bit order of the provided pattern information with the expected bit order of the pattern information.

Thus, the subject innovation can facilitate descrambling of the data signals from the memory 102 in an efficient manner while allowing flexibility in the layout of the memory circuitry (e.g., component layout, routing layout). Such flexibility in the circuit layout can enable higher density to be achieved with regard to memory devices, and/or can simplify manufacturing and/or can reduce the cost of manufacturing such memory devices.

It is to be appreciated that while four muxes representing a total of n muxes are shown in FIG. 3, the disclosed subject matter is not so limited. The disclosed subject matter contemplates that there also can be more or less than four muxes based on the total number of data lines associated with the memory 102.

Figure 4:
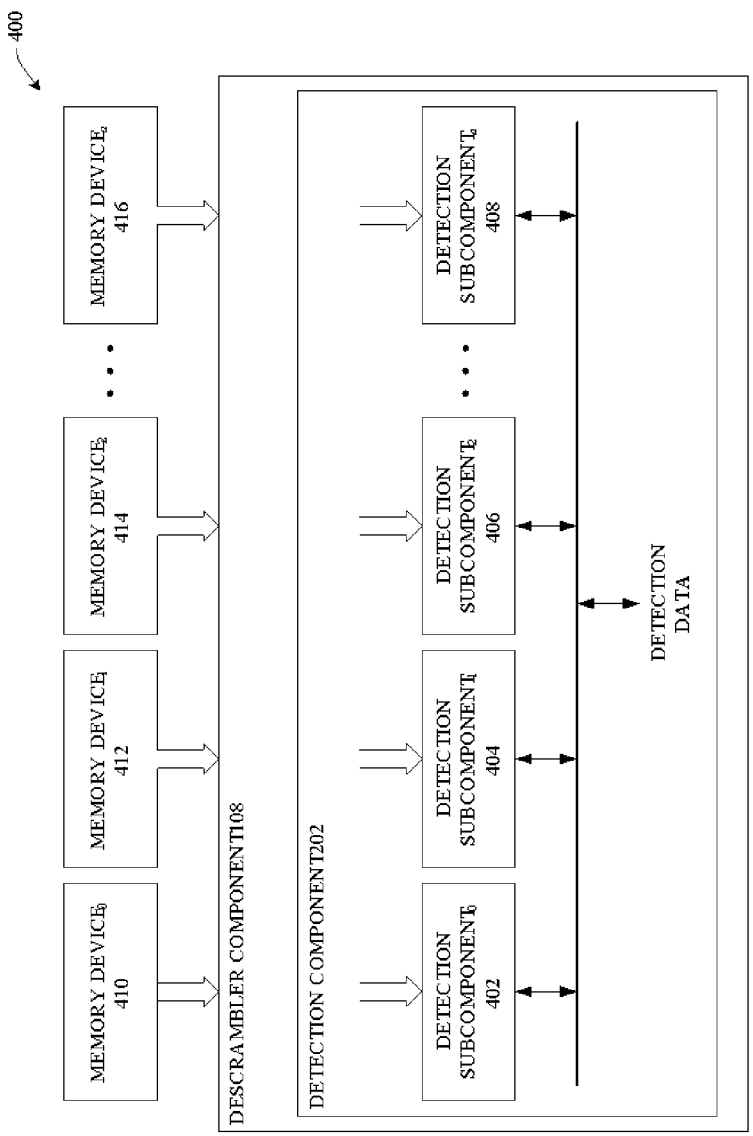
FIG. 4 illustrates a block diagram of a system that can descramble data signals in multiple memory devices in accordance with an embodiment of the disclosed subject matter.

Turning to FIG. 4, depicted is a system 400 that can employ a plurality of detection subcomponents to facilitate descrambling data signals associated with a memory in accordance with an embodiment of the disclosed subject matter. System 400 can include a descrambler component 108 that can facilitate descrambling data signals output from a memory device(s) (e.g., 102) (not shown). The descrambler component 108 can include a detection component 202 that can receive multi-bit pieces of data (e.g., pattern data) from a memory device(s) and can detect bit values of the received data to facilitate descrambling the data signals from the memory device(s).

Typically, a memory device(s) can contain data lines (e.g., memory bus) of a predetermined length, such as 8 bits, for example. Further, there can be more than one memory device associated with a system bus, where each memory device can contain an n-bit memory bus. In accordance with an aspect of the disclosed subject matter, the detection component 202 can be comprised of more than one detection subcomponent, detection subcomponent$_0$ 402, detection subcomponent$_1$ 404, detection subcomponent$_2$ 406, and/or detection subcomponent$_a$ 408, that can each be associated with a respective memory device, memory devices 410, memory device$_1$ 412, memory device$_2$ 414, and/or memory device$_a$ 416, where the value of a can correspond to the number of memory devices included in system 400. Each of detection subcomponents 402, 404, 406, 408, and memory devices 410, 412, 414, 416 can include the same or similar respective functionalities as more fully described herein, for example, with regard to system 100, system 200, and/or system 300.

When the memory devices 410, 412, 414, 414 are connected to the system bus, and are powered up, the memory devices 410, 412, 414, 414 can be initialized to descramble the data lines respectively associated with each of the memory devices 410, 412, 414, 414 so that the data input and/or output from the memory devices 410, 412, 414, 414 can be rearranged in a bit order in a desired bit order (e.g., from MSB to the LSB) so that such data can be properly interpreted and understood by other components, such as a host processor 104 (not shown). Each of the memory devices 410, 412, 414, 414 can include pattern information that can be provided to the corresponding detection subcomponents 402, 404, 406, 408, and the detection subcomponents 402, 404, 406, 408 can detect and/or determine bit values associated with pattern information, for example by utilizing muxes (e.g., 302, 304, 306, 308) (not shown) to facilitate descrambling the data signals from the memory devices 410, 412, 414, 414.

It is to be appreciated that while four detection subcomponents representing a total of a detection subcomponents and four memory devices representing a total of a memory devices are shown in FIG. 4, the disclosed subject matter is not so limited. The disclosed subject matter contemplates that there also can be more or less than four detection subcomponents and/or four memory devices.

Figure 5:
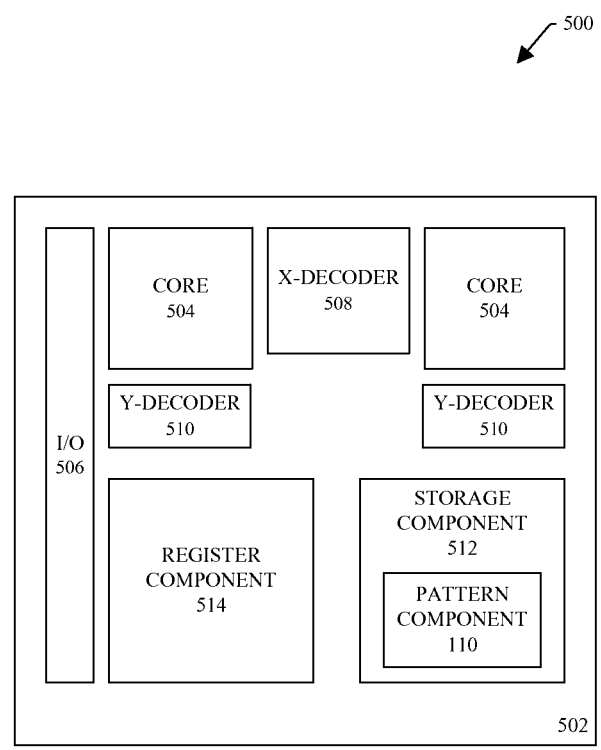
FIG. 5 depicts an example diagram of a memory device in accordance with the disclosed subject matter.

FIG. 5 illustrates an example of a system 500 that can facilitate data storage in accordance with an embodiment of the disclosed subject matter. System 500 generally can include a semiconductor substrate 502 in which one or more high-density core regions 504 and one or more lower-density peripheral regions can be formed. The high-density core regions 504 typically can include one or more M by N arrays of individually addressable, substantially identical multi-bit memory cells (not shown). The lower-density peripheral regions can typically include input/output (I/O) circuitry 506 and programming circuitry for selectively addressing the individual memory cells. The programming circuitry can be represented in part by and can include one or more x-decoders 508 and one or more y-decoders 510 that can cooperate with the I/O circuitry 506 for selectively connecting a source, gate, and/or drain of selected addressed memory cells to predetermined voltages or impedances to effect designated operations (e.g., programming, reading, erasing) on the respective memory cells, and deriving necessary voltages to effect such operations.

In accordance with one aspect, system 500 can comprise a memory, such as memory 102, that can be a flash memory device (e.g., single-bit flash memory, multi-bit flash memory). System 500 can further include a storage component 512 that can store one or more patterns associated with the pattern component 110 that can be utilized to facilitate descrambling of data signals provided as output from the memory. The storage component 512 can be associated with a register component 514 that can receive pattern information from the storage component 512. In one aspect, the register component can perform a series of bit shifts of received pattern information to shift bit values to other bit positions resulting in a new pattern. In accordance with another aspect, the register component 514 can perform a series of bit rotations of received pattern information to rotate bit values to other bit positions thereby yielding a new pattern. In yet another aspect the register component 514 can be comprised of one or more registers that can respectively contain pattern information. The pattern information can be provided to a descrambler component 108 (not shown) to facilitate initializing the memory and descrambling data signals from the memory, so that data that is output from the memory can be interpreted, transformed, and/or understood by other components, such as a host processor (not shown).

Figure 6:
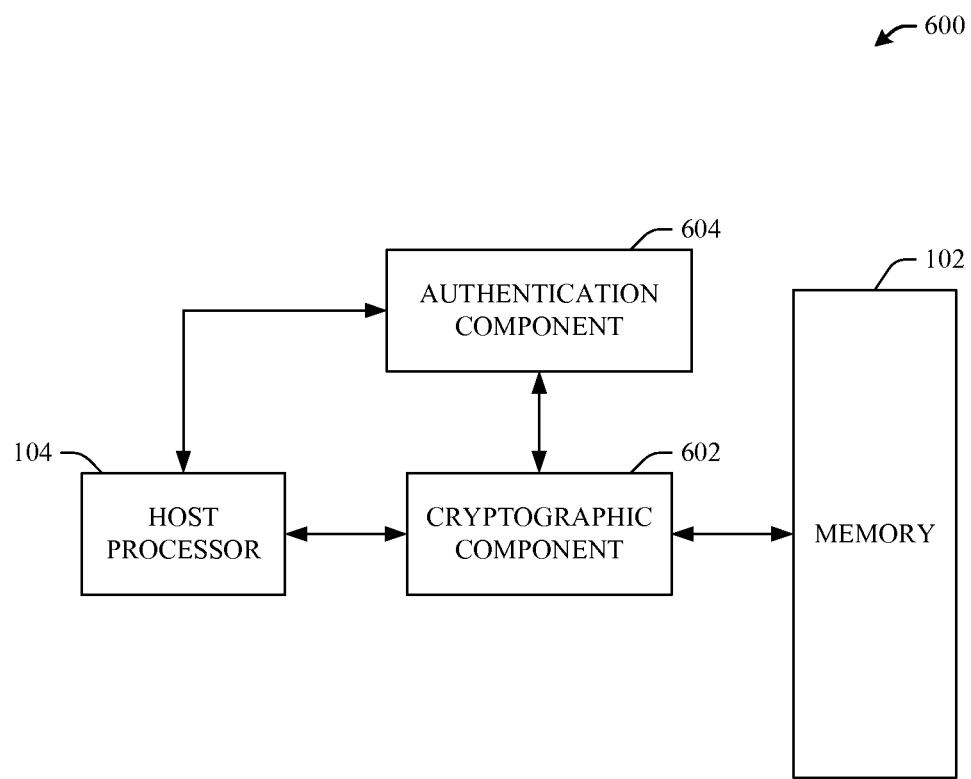
FIG. 6 illustrates a block diagram of a system that can descramble secure data signals in a memory device in accordance with the disclosed subject matter

Referring to FIG. 6, a block diagram of a system 600 that can facilitate descrambling of data signals associated with a memory in accordance with the disclosed subject matter is illustrated. System 600 can include a host processor 104 that can be associated with a memory 102, which can be a non-volatile memory (e.g., flash memory device) or volatile memory (e.g., DRAM), for example. It is to be appreciated that the memory 102, host processor 104, and descrambler component 108 can each include their respective functionality, as more fully described herein, for example, with regard to system 100, system 200, system 300, system 400, and/or system 500.

The host processor 202 can be associated with a cryptographic component 602 that can facilitate encrypting and/or decrypting data to facilitate securing data being written to, stored in, and/or read from the memory 102. In accordance with an aspect of the disclosed subject matter, cryptographic component 602 can provide symmetric cryptographic tools and accelerators (e.g., Twofish, Blowfish, AES, TDES, IDEA, CAST5, RC4, etc.) to ensure that a specified partition in memory component 102, or portions thereof, can only be accessed by those entities authorized and/or authenticated to do so. Cryptographic component 602 can also provide asymmetric cryptographic accelerators and tools (e.g., RSA, Digital Signature Standard (DSS), and the like) to ensure that a specified partition in memory 102, or portions thereof, only can be accessed by those entities that are authorized and certified to do so. Additionally, cryptographic component 602 can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 102 is confined to those entities authorized to gain access.

In accordance with one aspect of the disclosed subject matter, during initialization of the memory device(s) 102 to descramble the bit order of the data lines in the memory device(s) 102, the cryptographic component 602 can be bypassed, so that the predetermined pattern information can be provided in the same form as it was presented as output from the memory device(s) 102. In accordance with another aspect of the disclosed subject matter, during such initialization of the memory device(s) 102, the pattern information can be decrypted in accordance with a desired cryptographic algorithm or protocol. The descrambler component 108 can know or have access to such cryptographic algorithm or protocol, and can utilize such information so that it can know the data values of the pattern information after the pattern has been decrypted. The descrambler component 108 can account for the decryption of the pattern information when comparing the received pattern information with the expected bit order of the pattern information.

System 600 can further include an authentication component 604 that can solicit authentication data from an entity, and, upon the authentication data so solicited, can be employed, individually and/or in conjunction with information acquired and ascertained as a result of biometric modalities employed, to facilitate control access to the memory 102. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 604. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 604 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

In accordance with one embodiment of the disclosed subject matter, the memory 102, the cryptographic component 602, and the authentication component 604 can be situated or implemented on a single integrated-circuit chip. In accordance with another embodiment, the memory 102, the cryptographic component 602, and the authentication component 604 can be implemented on an application-specific integrated-circuit (ASIC) chip.

Figure 7:
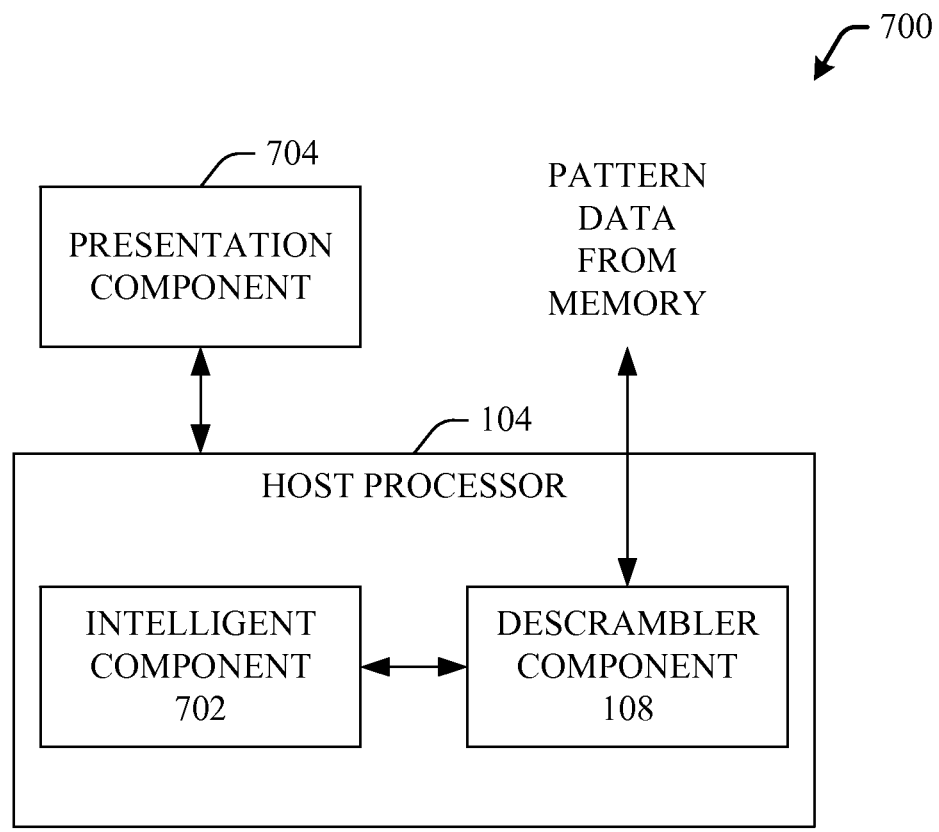
FIG. 7 depicts a block diagram of a system that employs intelligence to facilitate descrambling of data signals in a memory device in accordance with the disclosed subject matter.

Turning to FIG. 7, depicted is a system 700 that can employ intelligence to facilitate error correction of data in accordance with the disclosed subject matter. System 700 can include a host processor 104, controller component 106, and descrambler component 108 that each can be the same or substantially similar to respective components, and can include such respective functionality, as described herein, for example, with regard to system 100, system 200, system 300, system 400, system 500, and/or system 600.

The system 700 can further include an intelligent component 702 that can be associated with the descrambler component 108 to facilitate analyzing data (e.g., pattern information) and can make an inference(s) and/or a determination(s) regarding, for example, the bit order of data signals and/or data lines associated with a memory device(s) 102 (not shown), the value of a particular bit, etc.

For example, the intelligent component 702 can infer whether a bit order associated with data lines of a memory 102 is in a desired predetermined bit order, for example, where the bits are arranged from MSB to LSB. To further illustrate, the intelligent component 702 can analyze information, including pattern information, and based on current and/or historical evidence can render an inference regarding whether a bit order associated with data lines of a memory 102 and/or a bit order of the data signals is in a desired bit order (e.g., from MSB to LSB).

It is to be understood that the intelligent component 702 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 700 also can include a presentation component 704, which can be associated with the host processor 202. The presentation component 704 that provides various types of user interfaces to facilitate interaction between a user and any component coupled to the host processor 202. As depicted, the presentation component 704 is a separate entity that can be utilized with the host processor 202 and associated components. However, it is to be appreciated that the presentation component 704 and/or similar view components can be incorporated into the host processor 202 and/or a stand-alone unit. The presentation component 704 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 202.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

System 100, system 200, system 300, system 400, system 500, system 600, and/or system 700, or portions thereof, can be employed in virtually any electronic device where security of data is desired. Examples of such electronic devices can include a computer, a cellular phone, a digital phone, a video device (e.g., video playing and/or recording device), a smart card, a personal digital assistant (PDA), a television, an electronic game (e.g., video game), a digital camera, an electronic organizer, an audio player and/or recorder, an electronic device associated with digital rights management, Personal Computer Memory Card International Association (PCM-CIA) cards, trusted platform modules (TPMs), Hardware Security Modules (HSMs), set-top boxes, secure portable tokens, Universal Serial Bus (USB) tokens, key tokens, secure memory devices with computational capabilities, devices with tamper-resistant chips, and the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 8-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
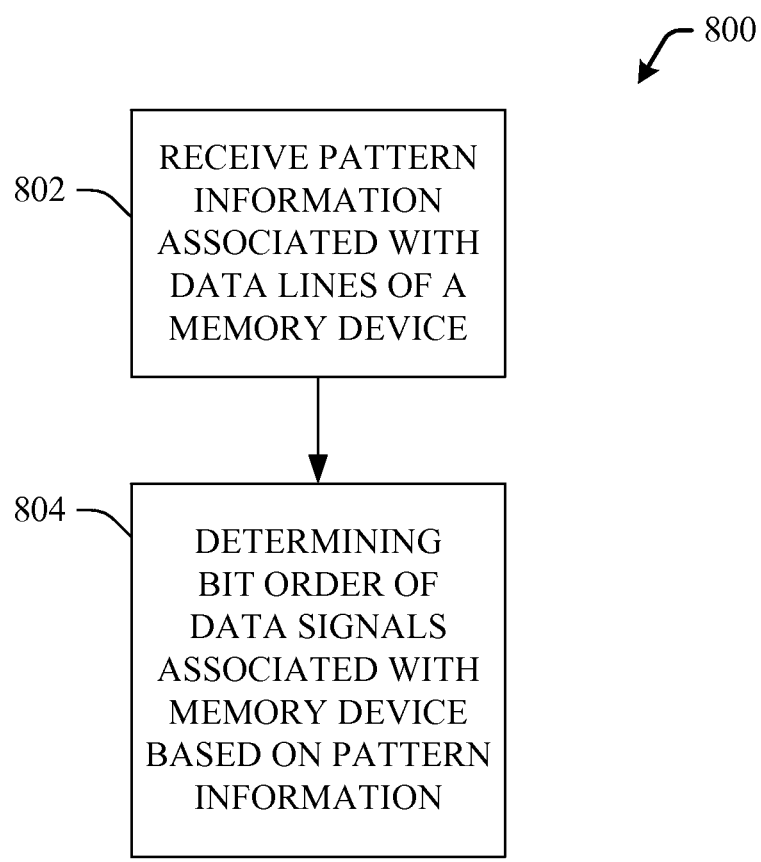
FIG. 8 illustrates a methodology that facilitates descrambling of data signals in a memory device in accordance with an aspect of the disclosed subject matter.

Referring to FIG. 8, a methodology 800 that can facilitate descrambling of a data bus lines in accordance with the disclosed subject matter is illustrated. At 802, pattern information can be received, where the pattern information can be related to data signals and/or data lines (e.g., memory bus) associated a memory device(s) (e.g., 102). The pattern information can be utilized to facilitate determining the bit order associated with the data signals or data lines of the memory device(s), so that the data presented by the memory device(s) can be transformed or placed in a desired bit order (e.g., arranged from MSB to LSB) when received by other components (e.g., host processor 104) associated with the memory device(s).

In accordance with one aspect, the pattern information can be one or more predefined patterns having a predefined number of bits that can correspond to the number of bits associated with the bus. Thus, given an 8-bit bus connected to a memory device having 8 data lines, the pattern can be comprised of 8 bits.

At 804, the bit order of the data signals and/or data lines associated with a memory device(s) can be determined based on the pattern information. A descrambler component (e.g., 108) in or associated with the host processor can know the bit values of each bit of the predefined patterns, and when the pattern information is received, the descrambler component can compare the bit order of the received pattern information with the expected bit order of the pattern information, and can determine the bit order of the data lines, and thus the data signals, associated with the memory device(s). The bit order information can be utilized to rearrange the bit order of data received from or written to the memory device(s) such that the data is in a desired predetermined bit order (e.g., arranged from MSB to LSB) to facilitate communication of data between the memory device(s) and other components, such as the host processor. At this point, methodology 800 can end.

Figure 9:
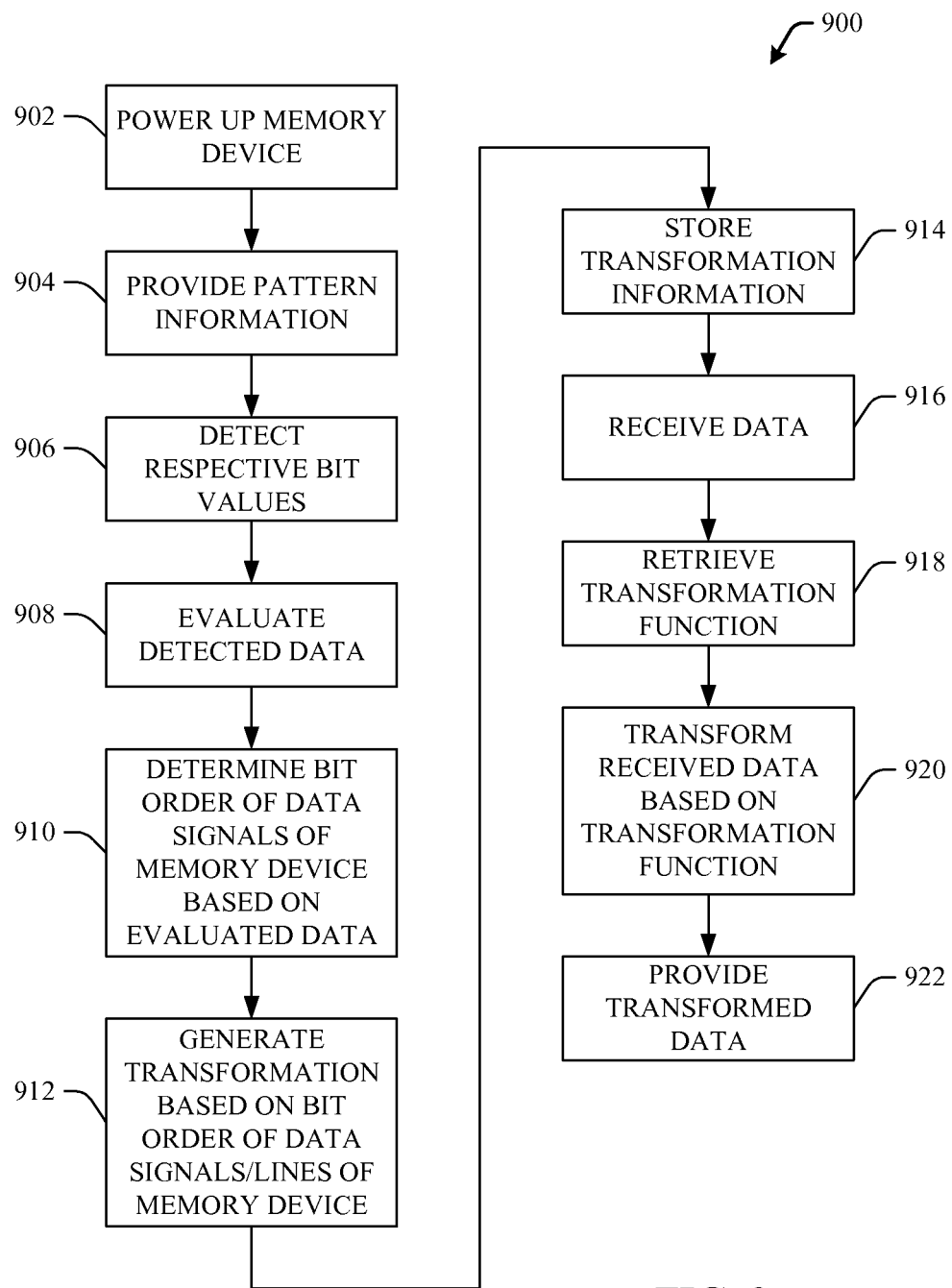
FIG. 9 depicts another methodology that facilitates descrambling of data signals in a memory device in accordance with an aspect of the disclosed subject matter

FIG. 9 depicts a methodology 900 that can facilitate descrambling data signals associated with a memory device in accordance with the disclosed subject matter. At 902, a memory device (e.g., 102) and/or other components (e.g., host processor 104) can be powered up. For example, an electronic device (e.g., cellular phone, PDA) can be powered up, which can provide power to the memory device and/or other components contained within the electronic device.

At 904, predetermined pattern information can be provided. For instance, the memory device(s) can provide pattern information to a descrambler component (e.g., 108) that can be associated with a host processor. In accordance with one aspect, the pattern information can be comprised of n-bits, where n can be the number of data lines associated with the memory. In accordance with one aspect, the bits of the pattern can each have a value of 1, except for the LSB, which can initially have a value of 0. The pattern can be provided to the descrambler component 108, and the pattern can then be serially shifted and/or rotated to facilitate moving the 0 bit value throughout the pattern to facilitate determining the bit order associated with the data lines of the memory.

In accordance with another aspect, data masking can be employed to facilitate descrambling data signals from a memory. With data masking, there can be a predetermined number of n-bit patterns, where the predetermined number of patterns m can be determined based on the number of data lines associated with the memory device. For example, if the memory device includes 8 data lines, 3 patterns can be generated and/or utilized to facilitate descrambling data signals associated with the memory, where the number of patterns m can be determined based on $\log_2(n)=m$. Each of the m patterns can have a distinct binary value such that the m patterns can result in n distinct significant bit combinations that each have a distinct value when the corresponding significant bits of each pattern are combined or grouped together. For example, for 8 data lines, there can be 3 patterns. The structure of the 3 patterns can be such that the binary value of the LSB combination, that is, the 3 LSBs of the three patterns, when grouped together, can be distinct from the binary value of the other significant bit combinations.

At 906, respective bit values can be detected. For example, a detection component (e.g., 202) can detect respective bit values of each bit of a pattern(s). At 908, the data associated with the detected bit values can be evaluated to facilitate determining the bit order of the data lines of the memory. For example, an evaluation component (e.g., 206) can evaluate data associated with detected bit values and/or other received data to determine the bit order of the data lines of the memory.

At 910, the bit order of the data lines of the memory device(s) can be determined based on the evaluation of the data. In one aspect, the evaluation component can render the determinations regarding the bit order of such data lines. At 912, a transformation function based on the bit order of the data lines of the memory device(s) can be determined. A transformation component (e.g., 210) can determine a transformation function that can be based on and/or associated with the determined bit order of the data lines of the memory. At 914, information associated with the transformation function can be stored, for example, in a descrambler storage component (e.g., 208).

At 916, data can be received, for example, by a host processor from the memory. The data can include data read from a memory location(s) in the memory, for instance. At 918, the transformation function can be retrieved from the descrambler storage component. At 920, the received data can be transformed based on the transformation function. The transformation function can be structured to facilitate placing data received from the memory in the proper bit order based on the determined bit order of the data lines associated with the memory.

For example, there can be data lines Dq(0) through Dq(7) in the memory. Given an instance where Dq(0) is connected data line 3 of the system bus, Dq(3) is connected to data line 4 of the system bus, and Dq(4) is connected to data line 0 of the system bus, the transformation function can be applied to re-arrange the bit order of the received data such that the data provided by Dq(0) can be placed in the LSB position, Dq(3) can be placed in the fourth bit position, and Dq(4) can be placed in the fifth bit position. Thus, if the memory provided a piece of data 1101 0110 corresponding to Dq(7) through Dq(0), the host processor can receive the data as 1100 0111. The transformation function can be applied to the received data to rearrange the data in the desired predetermined bit order so that the piece of data can be transformed to 1101 0110.

At 922, the transformed data can be provided. For instance, the transformed data can be provided to a display (e.g., GUI) to be perceived by a user. At this point, methodology 900 can end.

Figure 10:
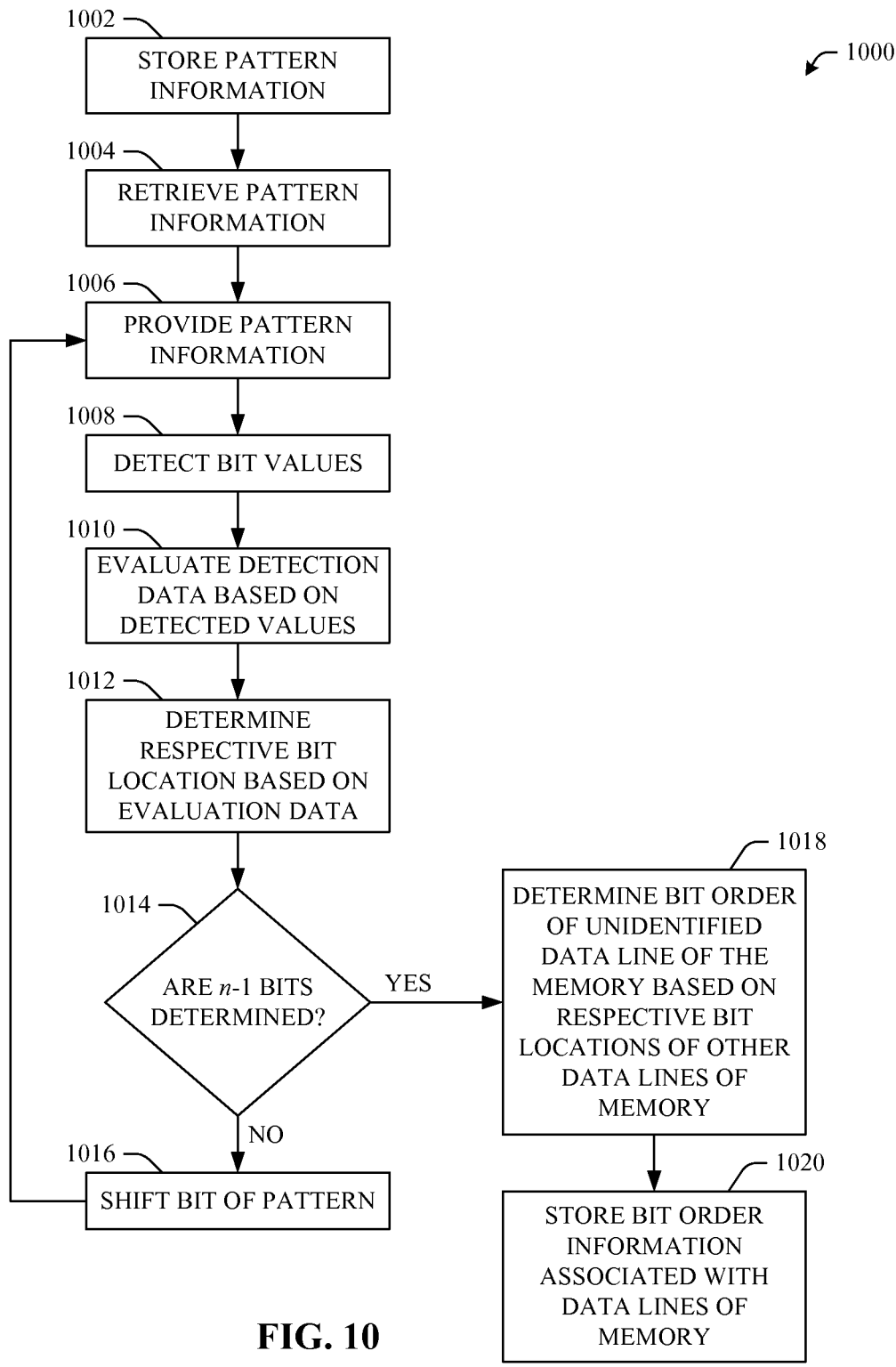
FIG. 10 illustrates a methodology that employs bit shifting to facilitate descrambling of data signals in a memory device in accordance with the subject matter disclosed herein.

Turning to FIG. 10, illustrated is a methodology 1000 that can employ bit shifting to facilitate descrambling data from a memory in accordance with the disclosed subject matter is illustrated. At 1002, pattern information can be stored, for example, in a storage component (e.g., 512) associated with a memory (e.g., 102), such as a non-volatile memory (e.g., flash memory) or a volatile memory (e.g. DRAM). The pattern information can be comprised of one or more patterns of data, where each pattern can be comprised of n bits of data, and where n can correspond to the number of data lines in the memory. In one aspect, a pattern can be stored which can have a value of 0 in the LSB position and all other bits of the pattern can have a value of 1. For example, for an 8-bit bus, the binary value of the pattern can be 1111 1110. At 1004, the pattern can be retrieved from the storage component. At 1006, the pattern information can be provided to a host processor (e.g., 104) via the data lines of the memory through the data lines of the system bus. Such pattern information can be provided to the controller component 106 and descrambler component 108 that can be within the host processor 104.

At 1008, the data values of each bit of data of the pattern can be detected and associated with the corresponding data line of the system bus that transported such bit of data. At 1010, the detected data can be analyzed and evaluated based on the pattern information, including information related to the respective data lines of the bus that transported the bits of pattern data. The descrambler component can know the pattern information that is going to be provided by the memory, and with such knowledge, can compare the bit order of the provided pattern information with the expected bit order of the pattern information.

At 1012, the respective bit location of at least one data line of the memory can be determined and/or identified based on the pattern information. For instance, if the pattern provided by the memory is 1111 1110, and the descrambler component 108 receives the pattern as 1101 1111, the descrambler component can determine that data line 5 of the bus has a value of 0 and that the 0 value for such pattern can correspond to data line, Dq(0), in the memory.

At 1014, a determination can be made as to whether all but the final bit location has been determined. That is, for an n-bit bus, it can be determined whether the bit location for n−1 bits have been identified. If it is determined that the bit locations of n−1 bits have not all been determined, at 1016, the current pattern can be bit shifted by one bit. In one aspect, a shift register in the memory can shift the pattern bits. For example, if the current pattern is 1111 1110, then the pattern can be shifted by one bit position so that the shifted pattern can be 1111 1101. The descrambler component 108 can know in advance the new pattern to be provided by the memory 102, so that the descrambler component 108 can know the data line from which to expect the 0 value for the new pattern. Methodology 1000 can return to reference numeral 1006, where the pattern, as shifted, can be provided and methodology 1000 can continue to determine another data line(s) of the memory.

If, at 1014, it is determined that the bit locations or the bit order of n−1 bits has been determined, then at 1018, the bit order (e.g., bit location) of the only unidentified data line of the memory can be determined based on the respective bit locations associated with the identified data lines of the memory. At 1020, the bit order information that can identify the bit order of the data lines of the memory can be stored, for example, in the descrambler storage component 208. At this point, methodology 1000 can end.

Figure 11:
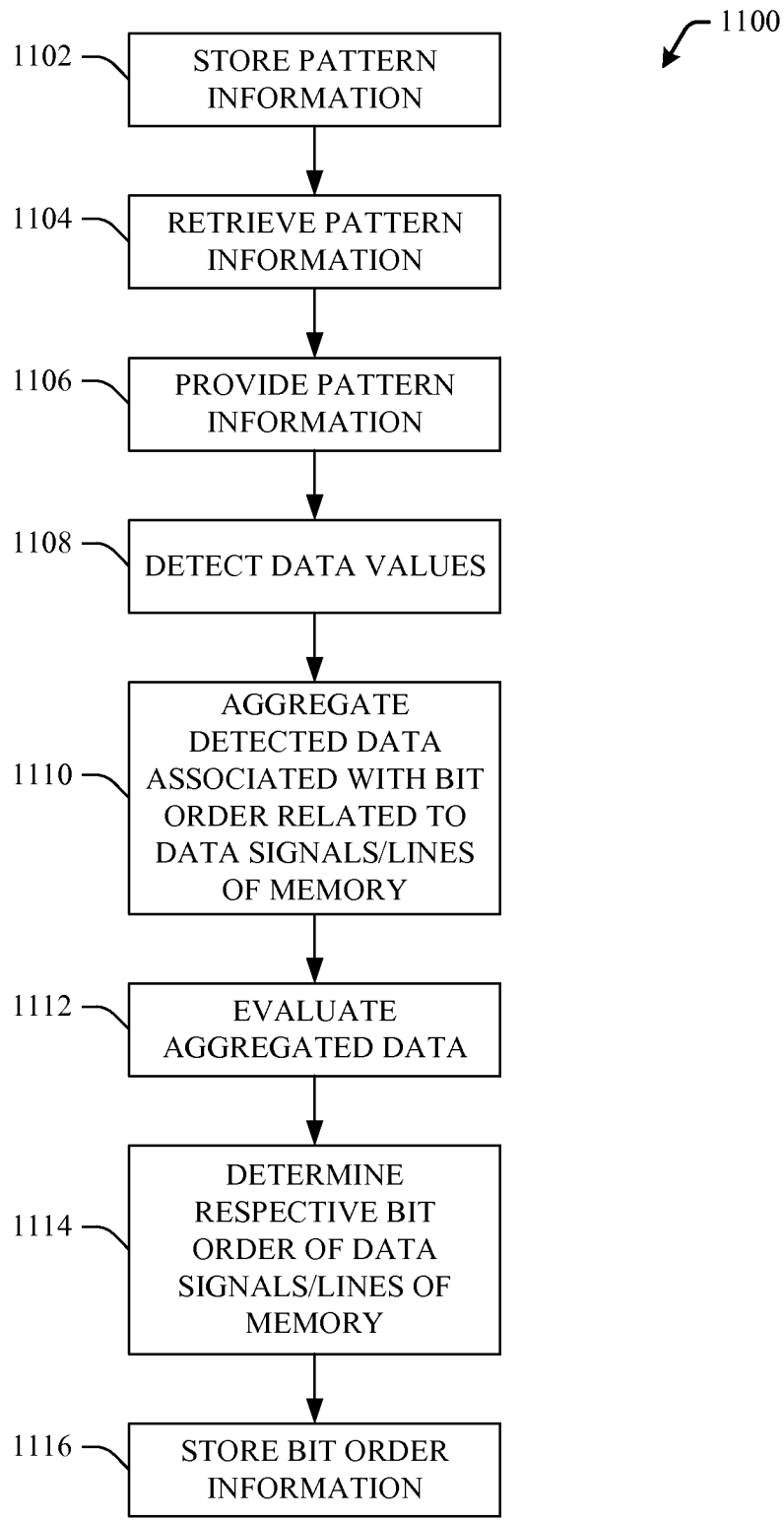
FIG. 11 depicts a methodology that employs data masking to facilitate descrambling of data signals in a memory device in accordance with the disclosed subject matter

Referring to FIG. 11, illustrated is a methodology 1100 that can employ data masking to facilitate descrambling data signals from a memory in accordance with the disclosed subject matter. At 1102, pattern information can be stored, for instance, in a storage component (e.g., 512) that can be in or associated with the memory (e.g., 102). The memory can be a non-volatile memory (e.g., flash memory) or a volatile memory (e.g., DRAM). The pattern information can be comprised of one or more patterns of data, where each pattern can be comprised of n bits of data, where n can correspond to the number of data lines in the memory. The number of patterns can be determined based on the number of data lines in the memory as $\log_2(n)=m$, where m can be the number of patterns. Thus, for example, if there are 8 data lines, there can be 3 patterns utilized to facilitate descrambling of the data signals associated with the data lines in the memory; if there are 16 data lines, there can be 4 patterns to facilitate descrambling of the data lines.

In one aspect, the patterns can be generated such that each pattern can have distinctive binary values and the patterns can be structured such that the binary value of a respective bit position for all patterns can be distinct. As such, a first pattern can have one-half of its bits on the MSB-side of the pattern set to a value of 1 and the other half of the bits on the LSB-side of the pattern set to a value of 0 (e.g., 1111 0000 for an 8-bit memory bus); a next pattern can be structured such that half of the bits associated with the MSB, which have a value 1 in the first pattern, and which are least significant bits of that subset of MSBs, can be set to a value of 0 with the other half of the bits associated with the MSB set to a value of 1, and half of the bits associated with the LSB, which have a value of 0 in the first pattern, and which are the most significant bits of that subset of LSBs, can be set to a value of 1 and the other half of the bits which can be the least significant bits of the subset of LSBs can be set to a value of 0 (e.g., 1100 1100 for an 8-bit memory bus); and this pattern structuring can continue until a last pattern can be generated where the pattern can have values that alternate, where the LSB can have a value of 0, the next significant bit can have a value of 1, the following bit can have a value of 0, with the MSB having a value of 1 (given an even number of bits) (e.g., 1010 1010 for an 8-bit memory bus).

At 1104, the patterns can be retrieved from the storage component. In one aspect, the patterns can be retrieved one pattern at a time. At 1106, each of the patterns can be provided to the host processor (e.g., 104) via the data lines of the memory through the system bus. In one aspect, the patterns can be provided to the host processor one pattern at a time. A descrambler component (e.g., 108) can be associated with the host processor and can know the pattern information that is going to be provided by the memory.

At 1108, the data values of each bit of data of each of the patterns can be detected and associated with the corresponding data line of the system bus that transported such bit of data. At 1110, each bit of detected data can be aggregated, where the detected data can be associated with the bit order of the data lines of the memory. The detected data can be based on the pattern information associated with all patterns provided to the host processor (and descrambler component 108). An aggregation component (e.g., 204) can organize the detected data so that each bit of data can be grouped and/or associated with the data line of the system bus that provided such bit of data and/or the pattern that provided such bit of data.

For example, given an 8-bit bus, where 3 patterns are provided to the descrambler component 108, the first pattern provided can be 1111 0000, the second pattern provided can be 1100 1100, and the third pattern provided can be 1010 1010. The aggregation component can organize the bits of data such that the data associated with the LSB from all 3 patterns can be grouped together in the order received to yield 000. Data from all 3 patterns associated with the next significant bit can be grouped to yield 001, and so on, until the data is aggregated. Further, the data can be aggregated based on the data line, such that, for example, the data line of the system bus that transported or delivered the 000 associated with the LSB can be associated with such binary data to facilitate identification of the data lines and descrambling of the data signals.

At 1112, the aggregated data can be analyzed and evaluated to determine the bit order of the data lines of the memory device. For example, an evaluation component (e.g., 206) can analyze the aggregated data in order to identify and/or determine the bit order of the data lines of the memory. At 1114, the bit order of the data lines of the memory device (e.g., memory bus) can be determined. The evaluation component can identify and/or determine the bit order of the data lines of the memory based on the pattern information, as detected and aggregated by the descrambler component. For example, if the data received on data line 3 of a system bus delivered the binary value 000 to the host processor, the evaluation component can have prior knowledge that the data line, Dq(0), in the memory device is the data line that is to provide the binary value of 000, and can identify Dq(0) as the data line associated with data line 3 of the system bus, and thus, when data is received in the host processor from data line 3 of the system bus, such data can be rearranged so that it can be placed in the LSB position of the piece of data. The evaluation component can further identify and/or determine the bit order of the other data lines of the memory in a similar manner.

At 1116, the bit order information can be stored in a descrambler storage component (e.g., 208), where such information can be used to facilitate rearranging and/or transforming data received from the memory by the host processor and/or data sent from the host processor to the memory. At this point, methodology 1100 can end.

Figure 12:
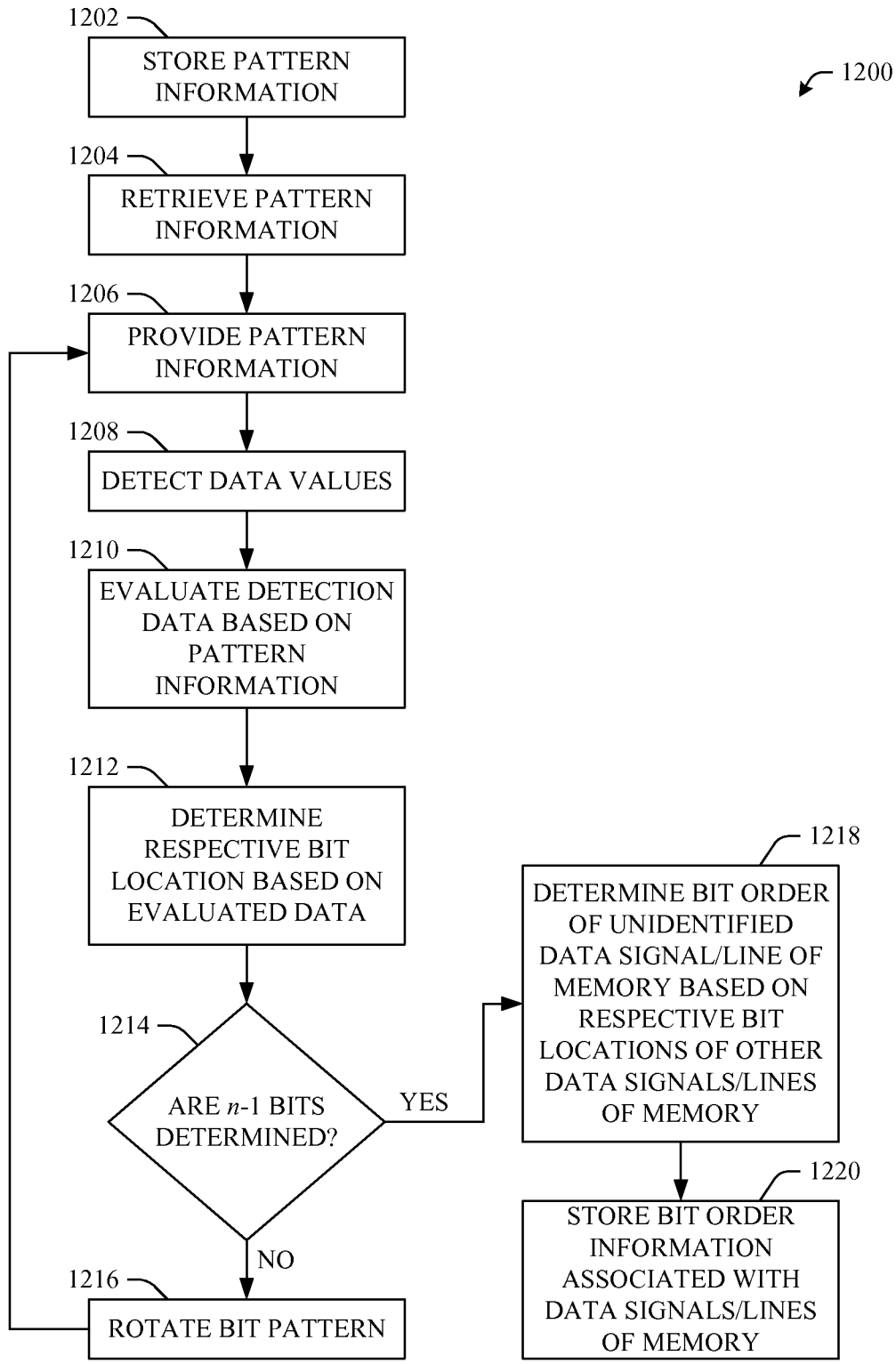
FIG. 12 illustrates a methodology that employs bit rotation to facilitate descrambling of data signals in a memory device in accordance with the disclosed subject matter.

Turning to FIG. 12, depicted is a methodology 1200 that can employ bit rotation to facilitate descrambling data signals from a memory device in accordance with the disclosed subject matter. At 1202, pattern information can be stored, for example, in a storage component (e.g., 512) associated with a memory (e.g., 102), which can be a non-volatile memory (e.g., flash memory) or a volatile memory (e.g., DRAM). The pattern information can be comprised of one or more patterns of data. Each pattern can be comprised of n bits of data, where n can correspond to the number of data lines in the memory. In one aspect, a pattern can be stored which can have a value of 0 in the LSB position and all other bits of the pattern can have a value of 1. For example, for an 8-bit bus, the binary value of the pattern can be 1111 1110. At 1204, the pattern can be retrieved from the storage component. At 1206, the pattern information can be provided to a host processor (e.g., 104) via the data lines of the memory through the data lines of the system bus. Such pattern information can be provided to a controller component (e.g., 106) and descrambler component (e.g., 108) that can be within the host processor.

At 1208, the data values of each bit of data of the pattern can be detected and associated with the corresponding data line of the system bus that transported such bit of data. At 1210, the detected data can be analyzed and evaluated based on the pattern information, including information related to the respective data lines of the bus that transported the bits of pattern data. The descrambler component can know the pattern information that is going to be provided by the memory, and with such knowledge, can compare the bit order of the provided pattern information with the expected bit order of the pattern information.

At 1212, the respective bit location of at least one data line of the memory can be determined and/or identified based on the pattern information. For instance, if the pattern provided by the memory is 1111 1110, and the descrambler component 108 receives the pattern as 1111 0111, the descrambler component can determine that data line 3 of the bus has a value of 0 and that the 0 value for such pattern can correspond to data line, Dq(0), in the memory.

At 1214, a determination can be made as to whether all but the final bit location has been determined. That is, for an n-bit bus, it can be determined whether the bit location (e.g., bit order) for n−1 bits have been identified. If it is determined that the bit locations of n−1 bits have not all been determined, at 1216, the bits of the current pattern can be rotated by one bit position. In one aspect, a register in the memory can rotate the pattern bits. For example, if the current pattern is 1111 1110, then the pattern can be rotated by one bit position to the left so that the shifted pattern can be 1111 1101. Alternatively, the current pattern can be rotated by one bit position to the right where the data can wrap around such that the new pattern can be 0111 1111. The descrambler component 108 can know in advance the new pattern to be provided by the memory regardless of whether the bit rotation is to the left or right and/or can know the direction of the bit rotation, so that the descrambler component 108 can know which data line is expected to provide a 0 value for the new pattern. Methodology 1200 can return to reference numeral 1206, where the pattern, as rotated, can be provided and methodology 1200 can continue to identify and/or determine the bit order of another data line(s) of the memory 102.

If, at 1214, it is determined that the bit locations or the bit order of n−1 bits has been determined, then at 1218, the bit order (e.g., bit location) of the only unidentified data line of the memory can be determined based on the respective bit locations associated with the identified data lines of the memory. At 1220, the bit order information that can identify the bit order of the data lines of the memory can be stored, for example, in the descrambler storage component 208. At this point, methodology 1200 can end.

Figure 13:
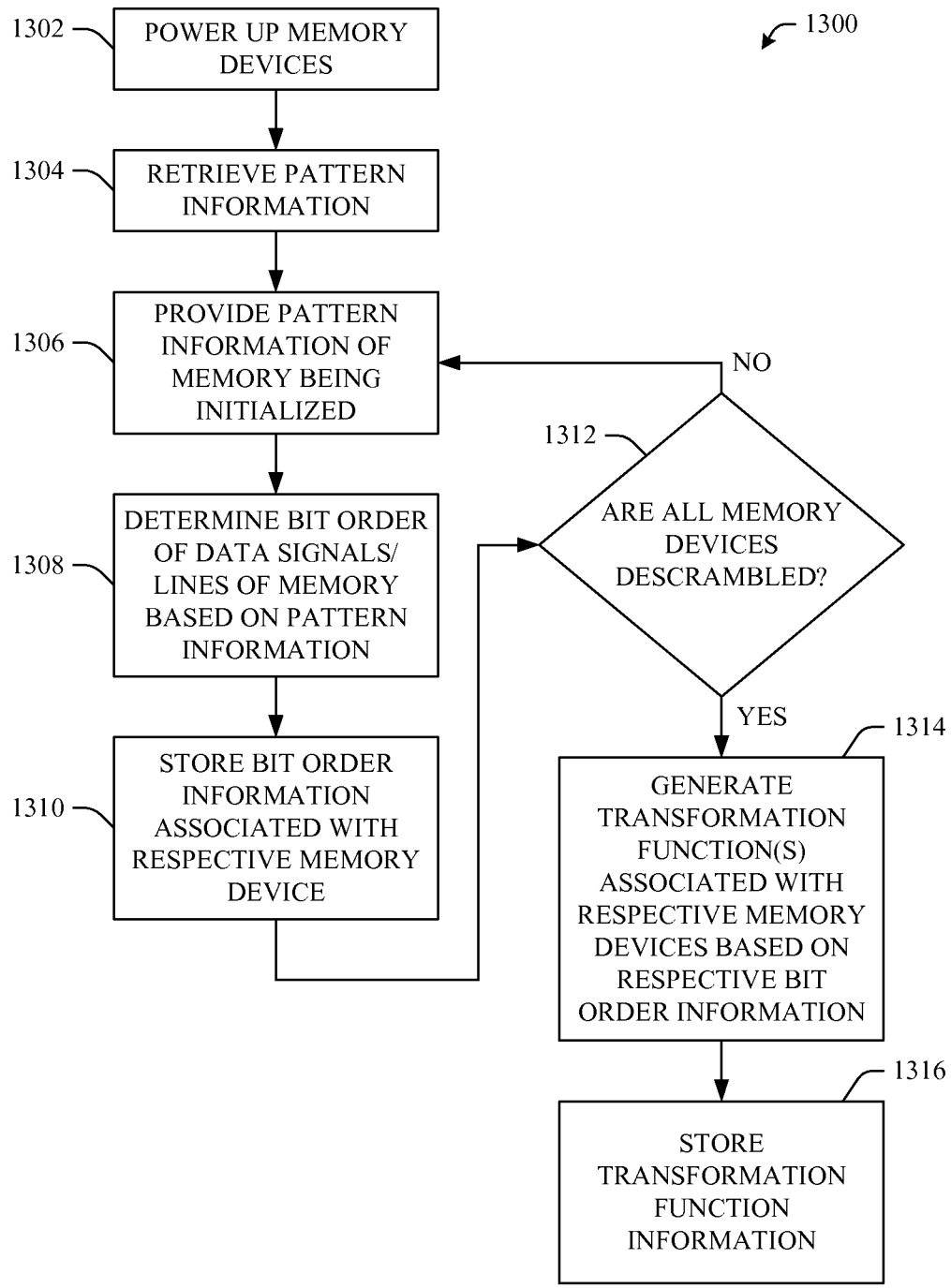
FIG. 13 depicts a methodology that facilitates descrambling of data signals of multiple memory devices in accordance with the disclosed subject matter

Turning to FIG. 13, depicted is a methodology 1300 that can facilitate descrambling of data signals in multiple memory devices in accordance with the disclosed subject matter. At 1302, each of the memory devices (e.g., 102) can be powered up. The memory devices can be comprised of non-volatile memory (e.g., flash memory) and/or volatile memory (e.g., DRAM). For example, an electronic device (e.g., cellular phone, PDA) can be powered up, which can provide power to each of the memory devices and/or other components contained within the electronic device.

At 1304, pattern information can be retrieved, for example, from storage components (e.g., 512) that each can be in or associated with respective memory devices. In accordance with one aspect, the pattern information can be comprised of n-bits, where n can be the number of data lines associated with a memory device. Thus, if each memory device has an 8-bit data output, the pattern(s) can be 8 bits in length. The pattern information can be comprised of one or more patterns that can facilitate descrambling of the data signals. The descrambler component (e.g., 108) in a controller (e.g., 106) in the host processor (e.g., 104) can know in advance the pattern information to be provided by the memory during the descrambling process, and can compare received pattern information with expected pattern information to facilitate descrambling of the data signals of each of the memory devices.

At 1306, the pattern information associated with a memory device being initialized can be provided, for instance, to the host processor. A descrambler component within a controller in the host processor can receive the pattern information and can utilize such information to descramble the data signals of the memory device. The controller can control the order of the initializing of the memory devices, including controlling which memory device can be initialized at a given time and/or which memory device is to provide the pattern information at a given time, for example.

At 1308, the bit order of the data lines of the memory device being initialized can be determined based on the pattern information. In one aspect, the descrambler component can determine such bit order. At 1310, the bit order information associated with a respective memory device can be stored, for example, in a descrambler storage component (e.g., 208).

At 1312, a determination can be made as to whether all memory devices have been initialized to descramble respective data signals of the memory devices, for example, in an electronic device that is comprised of more than one memory devices. If it is determined that all the memory devices have not been initialized, then methodology 1300 can return to reference numeral 1306 and can proceed from that point to initialize another memory device. If it is determined that all memory devices have been initialized, then at 1314, one or more transformation functions can be generated where each transformation function can be respectively associated with a memory device. Each transformation function can be determined and generated based on respective bit order information associated with each memory device. At 1316, the transformation function information can be stored, for example, in the descrambler component 208. The transformation function information can be utilized by the host processor to descramble respective data signals from memory devices, so that the data read from the memory and/or written to the memory can be placed in the proper bit order. At this point, methodology 1300 can end.

It is to be appreciated that the initializing of multiple memory devices to descramble data signals can be performed in alternative ways as well. In another aspect, the memory devices can be initialized at the same time. For instance, if data masking is employed to initialize 3 memory devices, where each memory device has an 8-bit data output, there can be 3 patterns for each memory device that can be utilized to descramble the respective data signals of the memory devices. The first memory device can provide a first pattern which can be detected and evaluated by the descrambler component. The second memory device can also provide its first pattern which can be detected and evaluated by the descrambler component, and the third memory device can do the same. The first memory device can then provide its second pattern, as can the second memory device, and third memory device. The first memory device can then provide its third pattern, as can the second memory device, and third memory device. The descrambler component can evaluate all of the respective pattern information and can determine the bit order of the respective data lines of each memory device and the respective transformation functions that can correspond with such bit orders.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone, watch), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, are intended to refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    a controller component configured to control at least one memory device to facilitate communication of data between a host processor and the at least one memory device, wherein the at least one memory device includes a predefined number of data lines utilized to communicate data signals; and
    a descrambler component configured to receive pattern information that facilitates a determination of a bit order of the data signals associated with the at least one memory device from the at least one memory device, determine the bit order of the data signals associated with the at least one memory device in order of relative bit significance of the data signals to each other from a most significant bit down to a least significant bit based at least in part on the pattern information, and generate a transformation function based at least in part on the bit order of the data signals associated with the at least one memory device, wherein the transformation function facilitates rearrangement of the data signals from an original order to a transformed order that results in the data signals associated with the at least one memory device being arranged from the most significant bit down to the least significant bit to correspond with a bit order of the host processor, in accordance with the bit order of the data signals, to enable the data signals to be presented in parallel in the transformed order from the most significant bit down to the least significant bit, and wherein the descrambler component is configured to be associated with the controller component.

2. The system of claim 1, wherein the pattern information is comprised of a predetermined number of predefined patterns, the predetermined number is based at least in part on the predefined number of data lines associated with the at least one memory device, wherein the pattern information comprising a first pattern comprising a first set of data values indicative of the least significant bit and a second pattern comprising a second set of data values indicative of the most significant bit, the descrambler component is further configured to receive the first pattern and the second pattern from the at least one memory device, determine that a first data signal of the data signals is associated with the least significant bit based at least in part on the first pattern, and determine that a second data signal of the data signals is associated with the most significant bit based at least in part on the second pattern.

3. The system of claim 1, wherein at least one of a series of bit shifts, a series of bit rotations, or a data mask is employed to facilitate generation of the pattern information by the at least one memory device.

4. The system of claim 1, wherein the descrambler component is comprised of a predetermined number of multiplexer components, the predetermined number is based at least in part on the predefined number of data lines associated with the at least one memory device.

5. The system of claim 1, wherein the predefined number of data lines comprising at least three data lines, including a first data line configured to communicate a first data signal of the data signals, and wherein the transformation function being configured to rearrange the first data line from being associated with one of the most significant bit, a middle significant bit, or the least significant bit to a different one of the most significant bit, the middle significant bit, or the least significant bit, based at least in part on the transformation function, the middle significant bit being less significant than the most significant bit and more significant than the least significant bit.

6. The system of claim 1, further comprising a descrambler storage component configured to store the transformation function.

7. The system of claim 1, wherein the at least one memory device is comprised of more than one memory and the descrambler component is further configured to determine a respective bit order of respective data signals respectively associated with each memory and generate a corresponding transformation function associated with each memory.

8. The system of claim 1, wherein the host processor is configured to manage communications, execute an application, generate at least one command, and facilitate execution of the at least one command, the at least one command is at least one of a read command, write command, or erase command.

9. The system of claim 1, wherein the descrambler component is configured to utilize a data mask to facilitate the determination of the bit order of the data signals, wherein the data mask comprises a number of predefined patterns comprising a first predefined pattern and a second predefined pattern, wherein the number of predefined patterns is based at least in part on the predefined number of data lines of the at least one memory device, and wherein a first structure of the first predefined pattern and a second structure of the second predefined pattern of the data mask are distinct with respect to each other, and a combination of the first predefined pattern and the second predefined pattern in the data mask results in a binary value of a least significant bit of the combination of the first predefined pattern and the second predefined pattern being different from another binary value of another significant bit of the combination of the first predefined pattern and the second predefined pattern.

10. The system of claim 1, wherein the at least one memory device is comprised of at least one of non-volatile memory or volatile memory, the non-volatile memory is comprised of at least one of a read only memory (ROM), a programmable ROM (PROM), an electrically programmable ROM (EPROM), an electrically erasable programmable ROM (EEPROM), or a flash memory, the volatile memory is comprised of at least one of a random access memory (RAM), a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), or a Rambus dynamic RAM (RDRAM).

11. An electronic device comprising the system of claim 1, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), a Hardware Security Module (HSM), a set-top box, a secure portable token, a Universal Serial Bus (USB) token, a key token, a secure memory device with computational capabilities, or an electronic device with a tamper-resistant chip.

12. A method, comprising:
receiving pattern data that facilitates determining a bit order of data signals associated with at least one memory device from the at least one memory device;
determining the bit order of the data signals associated with the at least one memory device in order of relative bit significance of the data signals to each other from a most significant bit down to a least significant bit based at least in part on the pattern data; and
generating at least one transformation function based at least in part on the bit order of the data signals associated with the at least one memory device, wherein the transformation function facilitates re-ordering the data signals associated with the at least one memory device from an original order to a transformed order that results in the data signals associated with the at least one memory device being ordered from the most significant bit down to the least significant bit to correspond with a bit order of a host processor associated with the at least one memory device, in accordance with the bit order of the data signals, to enable the data signals to be presented in parallel from the most significant bit down to the least significant bit in accordance with the transformed order.

13. The method of claim 12, further comprising:
storing the pattern data, the pattern data comprising at least one pattern;
powering up the at least one memory device;
retrieving the pattern data;
providing the pattern data;
detecting bit values associated with the pattern data; and
evaluating data associated with the pattern data.

14. The method of claim 12, further comprising:
receiving the data signals;
transforming the data signals to generate transformed data signals, based at least in part on the at least one transformation function; and
providing the transformed data signals.

15. The method of claim 12, further comprising:
providing a pattern, wherein the pattern comprises a plurality of bits where all bits have a binary value of 1 except the least significant bit which has a binary value of 0;

detecting respective bits values of the pattern;
determining a bit position of a data line associated with the binary value of 0;
shifting the pattern at least one time, wherein the pattern is shifted by one bit position to move the binary value of 0 to the next significant bit position, and the pattern is shifted a predetermined number of times based at least in part on the number of bits in the pattern; and
providing the shifted pattern.

16. The method of claim 12, further comprising:
providing a pattern, wherein the pattern comprises a plurality of bits where all bits have a binary value of 1 except the least significant bit which has a binary value of 0;
detecting respective bits values of the pattern;
determining a bit position of a data line associated with the binary value of 0;
rotating the pattern at least one time, wherein the pattern is rotated by one bit position to move the binary value of 0 to the next significant bit position, and the pattern is rotated a predetermined number of times based at least in part on the number of bits in the pattern; and
providing the rotated pattern.

17. The method of claim 12, further comprising:
generating a predetermined number of distinct patterns based at least in part on a number of data lines associated with the at least one memory device;
providing the predetermined number of distinct patterns;
detecting respective data values associated with the predetermined number of distinct patterns;
organizing the respective data values associated with the predetermined number of distinct patterns based at least in part on a corresponding bit position of such respective data values and an order in which the predetermined number of distinct patterns are provided;
evaluating the organized respective data values; and
determining the bit order of the data signals associated with the at least one memory device based at least in part on the distinct patterns.

18. The method of claim 12, wherein the at least one memory device comprises a first memory device and a second memory device, the method further comprising:
determining a first bit order of a first set of data signals associated with the first memory device;
storing a first subset of bit order information associated with the first bit order of the first set of data signals associated with the first memory device;
determining a second bit order of a second set of data signals associated with the second memory device;
storing a second subset of bit order information associated with the second bit order of the second set of data signals associated with the second memory device;
generating at least one of a first transformation function associated with the first memory device or a second transformation function associated with the second memory device; and
storing the at least one of the first transformation function or the second transformation function.

19. A computer-readable storage device storing computer-executable instructions that, in response to execution, cause a system including at least one processor to perform operations, comprising:
receiving at least one pattern that facilitates determining a bit order of data signals associated with a memory from the memory;
determining the bit order of the data signals associated with the memory in order of relative bit significance of the data signals to each other from a most significant bit down to a least significant bit based at least in part on the at least one pattern; and
generating a transformation function based at least in part on the bit order of the data signals associated with the memory, wherein the transformation function facilitates rearranging the data signals from an original order to a transformed order that results in the data signals associated with the memory being arranged from the most significant bit down to the least significant bit to correspond with a bit order of a host processor associated with the memory, in accordance with the bit order of the data signals, to enable the data signals to be presented in parallel from the most significant bit down to the least significant bit in accordance with the transformed order.

20. The computer-readable storage device of claim 19, the operations further comprising:
detecting respective data values of the at least one pattern;
aggregating data associated with the at least one pattern;
evaluating data associated with the at least one pattern; and
transforming an order of the data signals based at least in part on the transformation function.

* * * * *